US008638158B2

(12) United States Patent
Morishita et al.

(10) Patent No.: US 8,638,158 B2
(45) Date of Patent: Jan. 28, 2014

(54) SIGNAL TRANSMITTING APPARATUS

(75) Inventors: Hidetoshi Morishita, Takahama (JP); Masaki Wasekura, Toki (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/576,292

(22) PCT Filed: Feb. 1, 2010

(86) PCT No.: PCT/JP2010/051354
§ 371 (c)(1),
(2), (4) Date: Jul. 31, 2012

(87) PCT Pub. No.: WO2011/092864
PCT Pub. Date: Aug. 4, 2011

(65) Prior Publication Data
US 2012/0319743 A1 Dec. 20, 2012

(51) Int. Cl.
*H03K 17/56* (2006.01)
(52) U.S. Cl.
USPC .......................................... 327/423; 324/424
(58) Field of Classification Search
None
See application file for complete search history.

(56) References Cited

U.S. PATENT DOCUMENTS

| 5,952,856 | A  | * | 9/1999  | Horiguchi et al. ............ 327/110 |
| 6,052,017 | A  | * | 4/2000  | Pidutti et al. .................. 327/424 |
| 6,262,600 | B1 |   | 7/2001  | Haigh et al. |
| 6,720,816 | B2 |   | 4/2004  | Strzalkowski |
| 6,903,578 | B2 |   | 6/2005  | Haigh et al. |
| 6,922,080 | B2 |   | 7/2005  | Haigh et al. |
| 7,057,329 | B2 |   | 6/2006  | Barth et al. |
| 2002/0017919 | A1 |   | 2/2002  | Haigh et al. |
| 2003/0128053 | A1 |   | 7/2003  | Haigh et al. |
| 2004/0207431 | A1 |   | 10/2004 | Haigh et al. |
| 2007/0252635 | A1 | * | 11/2007 | Otoshi et al. .................. 327/423 |
| 2009/0091413 | A1 |   | 4/2009  | Kato et al. |
| 2009/0160357 | A1 | * | 6/2009  | Fukumoto ...................... 315/291 |
| 2012/0294045 | A1 | * | 11/2012 | Fornage et al. ................. 363/17 |
| 2013/0127530 | A1 | * | 5/2013  | Ni et al. ........................ 330/251 |

FOREIGN PATENT DOCUMENTS

JP  2003-523147 A  7/2003
JP  2007-123650 A  5/2007

(Continued)

OTHER PUBLICATIONS

International Search Report mailed Mar. 2, 2010 & Written Opinion of PCT/JP2010/051354.

*Primary Examiner* — Tuan T Lam
(74) *Attorney, Agent, or Firm* — Kenyon & Kenyon LLP

(57) ABSTRACT

A signal transmitting apparatus that may suppress generation of a noise voltage attributable to a common mode voltage is provided. A transistor P1 is connected between a first terminal of a sending coil and a power supply voltage. A transistor N1 is connected between the first terminal and a ground voltage. A transistor P2 is connected between a second terminal of the sending coil and the power supply voltage. A transistor N2 is connected between the second terminal and the ground voltage. In a period-PE1 a coil current flowing in a positive direction is generated by turning on the transistors P1 and N2 and turning off the transistors P2 and N1, and then the transistor N1 is turned on in response to turning off the transistor P1. In a period PE2, a coil current flowing in a negative direction is generated by turning off the transistors P1 and N2 and turning on the transistors P2 and N1, and then the transistor N2 is turned on in response to turning off the transistor P2.

9 Claims, 12 Drawing Sheets

(56) References Cited

FOREIGN PATENT DOCUMENTS

| | | |
|---|---|---|
| JP | 2009-60272 A | 3/2009 |
| JP | 2009-94576 A | 4/2009 |
| WO | 01/61951 A1 | 8/2001 |
| WO | 2011/111168 A1 | 9/2011 |

* cited by examiner

US 8,638,158 B2

SIGNAL TRANSMITTING APPARATUS

This is a 371 national phase application of PCT/JP2010/051354 filed 1 Feb. 2010, the contents of which are incorporated herein by reference.

TECHNICAL FIELD

The present application relates to a signal transmitting apparatus which transmits a signal inputted to a sending circuit to a receiving circuit that is insulated electrically from the sending circuit.

BACKGROUND ART

A technique is known in which a non-optical isolator that sends and receives signals via a separation barrier such as a transformer is driven by an H-bridge. An example of a prior-art signal transmitting apparatus 100 is shown in FIG. 14. In the signal transmitting apparatus 100, a signal inputted to an input terminal IN is transmitted to a receiving circuit 130. A sending-side ground voltage GNDL and a receiving-side ground voltage GNDH are separated from each other. An H-bridge is formed by transistors P1, P2, N1, and N2. A transformer TR comprises a sending coil L1 and a receiving coil L2. The transistors P1, P2, N1, and N2 of the H-bridge are on-off controlled in response to a signal inputted to the input terminal IN. Accordingly, a current flows through the sending coil L1 of the transformer TR and, in turn, a current flows through the receiving coil L2. The receiving circuit 130 detects the signal inputted to the input terminal from the current flowing through the receiving coil L2. Moreover, in the drawing, series resistance components of the sending coil L1 are denoted by Rs1 and Rs2, and series resistance components of the receiving coil L2 are denoted by Rs3 and Rs4. In addition, parasitic capacitances between the sending coil L1 and the receiving coil L2 are denoted by Cc1 and Cc2. Furthermore, respective capacitance values of the parasitic capacitances Cc1 and Cc2 are expressed as a capacitance C and respective resistance values of the series resistance components Rs3 and Rs4 are expressed as a resistance R. Techniques related to the present application are disclosed in U.S. Pat. No. 6,720,816, Japanese Translation of PCT Application No. 2003-523147, and Japanese Patent Application Publication No. 2007-123650.

SUMMARY OF INVENTION

Technical Problem

A common mode voltage VCM may be applied between a power supply terminal of the sending-side ground voltage GNDL and a power supply terminal of the receiving-side ground voltage GNDH. Let us assume that a voltage changing rate of the common mode voltage VCM at this point is (dv/dt). Accordingly, a displacement current i (=capacitance C×dv/dt) flows through the parasitic capacitances Cc1 and Cc2. In addition, for example, when the transistor N1 is turned on in a case in which a voltage of the sending-side ground voltage GNDL is lower than a voltage of the receiving-side ground voltage GNDH, the displacement current i flows along a path i1. The path it is a path from one terminal of the receiving coil L2 to the ground voltage GNDL via the parasitic capacitance Cc1, the series resistance component Rs1, and the transistor N1. Furthermore, the path i1 is an asymmetric current path with respect to the transformer TR. On the other hand, when the transistor N2 is turned on in the case in which the voltage of the sending-side ground voltage GNDL is lower than the voltage of the receiving-side ground voltage GNDH, the displacement current i flows along a path i2. The path i2 is a path from another terminal of the receiving coil L2 to the ground voltage GNDL via the parasitic capacitance Cc2, the series resistance component Rs2, and the transistor N2. The path i2 is also an asymmetric current path with respect to the transformer TR. Due to the displacement current i flowing through the asymmetric current paths, a noise voltage (=displacement current i×resistance R) that is unrelated to a signal component is generated on a side of the receiving coil L2. Consequently, since the noise voltage is superimposed on a signal voltage, a signal may be erroneously detected at the receiving circuit 130.

Solution to the Technical Problem

A signal transmitting apparatus disclosed in the present application may have a sending coil and receiving coil. The sending coil and the receiving coil may be insulated electrically. A signal may be transmitted from the sending coil to the receiving coil. The signal transmitting apparatus may comprise an upper first switching element provided between a first terminal of the sending coil and a power supply terminal of a high reference voltage, and a lower first switching element provided between the first terminal and a power supply terminal of a low reference voltage. The signal transmitting apparatus may comprise an upper second switching element provided between a second terminal of the sending coil and the power supply terminal of the high reference voltage, and a lower second switching element provided between the second terminal and the power supply terminal of the low reference voltage. The signal transmitting apparatus may further comprises a switching element controlling module that controls the upper first switching element, the lower first switching element, the upper second switching element and the lower second switching element. The switching element controlling module may perform a first control and a second control. The first control may generate a coil current flowing through the sending coil in a first direction by turning on the upper first switching element and the lower second switching element and turning off the upper second switching element and the lower first switching element, and then turn on the lower first switching element in response to turning off the upper first switching element. The second control may generate a coil current flowing through the sending coil in a second direction by turning off the upper first switching element and the lower second switching element and turning on the upper second switching element and the lower first switching element, and then turn on the lower second switching element in response to turning off the upper second switching element.

With the signal transmitting apparatus, the sending coil and the receiving coil are insulated electrically and a low reference voltage of the sending coil and a low reference voltage of the receiving coil are separated from each other. A transformer is formed by the sending coil and the receiving coil. In addition, a parasitic capacitance exists between the sending coil and the receiving coil. When a common mode voltage is applied between a power supply terminal of the low reference voltage of the sending coil and a power supply terminal of the low reference voltage of the receiving coil, a displacement current flows through the parasitic capacitance. For example, when the common mode voltage is applied in a state in which the low reference voltage of the sending coil is lower than the low reference voltage of the receiving coil, the displacement current flows from the receiving coil to the low reference voltage of the sending circuit via the parasitic capacitance and the sending coil. Since series resistance components exist at both terminals of the receiving coil, a noise voltage is generated by the series resistance components when the displacement current flows through the receiving coil.

With the signal transmitting apparatus according to the present application, the lower first switching element is turned on in response to turning off the upper first switching element during the first control. In addition, the lower second switching element is turned on in response to turning off the upper second switching element during the second control. As a result, there is a period in which both the lower first switching element and the lower second switching element are turned on. During this period, both voltages of the first terminal and the second terminal of the sending coil become low reference voltages and enter a low impedance state. In addition, since both the first terminal and the second terminal are in a low impedance state, the displacement current due to the common mode voltage flows through both a first current path (a path from one terminal of the receiving coil to the low reference voltage of the sending coil via a parasitic capacitance, the first terminal of the sending coil, and the lower first switching element) and a second current path (a path from another terminal of the receiving coil to the low reference voltage of the sending coil via a parasitic capacitance, the second terminal of the sending coil, and the lower second switching element). Accordingly, since displacement currents with directions that are opposite to each other flow through both terminals of the receiving coil, influences of the displacement currents cancel each other out. As a result, since a noise voltage can be suppressed from being generated on a side of the receiving coil, a situation in which a signal is erroneously detected by the receiving circuit can be prevented.

In the signal transmitting apparatus disclosed in the present application, the switching element controlling module may further comprise a first pulse outputting module that outputs a first pulse signal by detecting a rising edge of an inputted signal, a second pulse outputting module that outputs a second pulse signal by detecting a falling edge of the inputted signal, a first inverting module that generates an inverted first pulse signal that is a signal having inverted the first pulse signal, and a second inverting module that generates an inverted second pulse signal that is a signal having inverted the second pulse signal. The first pulse signal may be supplied to the upper first switching element. The inverted first pulse signal may be supplied to the lower first switching element. The second pulse signal may be supplied to the upper second switching element. The inverted second pulse signal may be supplied to the lower second switching element.

The first pulse signal is supplied to the upper first switching element and the inverted first pulse signal is supplied to the lower first switching element. The first pulse signal and the inverted first pulse signal are complementary signals. Therefore, during the first control, control can be performed so that the lower first switching element is turned on in response to turning off the upper first switching element. In a similar manner, the second pulse signal is supplied to the upper second switching element and the inverted second pulse signal is supplied to the lower second switching element. The second pulse signal and the inverted second pulse signal are complementary signals. Therefore, during the second control, control can be performed so that the lower second switching element is turned on in response to turning off the upper second switching element. As a result, switching elements can be controlled so that a period exists in which both the lower first switching element and the lower second switching element are turned on.

In the signal transmitting apparatus disclosed in the present application, the switching element controlling module may further comprise a delay circuit that delays rising edges of the first pulse signal, the second pulse signal, the inverted first pulse signal and the inverted second pulse signal by a predetermined time. The first pulse signal and the second pulse signal outputted from the delay circuit may be supplied to the upper first switching element and the upper second switching element. The inverted first pulse signal and the inverted second pulse signal outputted from the delay circuit may be supplied to the lower first switching element and the lower second switching element.

When a rising edge of the inverted fat pulse signal is delayed by the delay circuit, a dead time period in which both the first pulse signal and the inverted first pulse signal are at low levels is created bet a falling edge of the first pulse signal and a rising edge of the inverted first pulse signal. Since both the upper first switching element and the lower first switching element are turned off during the dead time period, a through current can be prevented from flowing from the upper first switching element to the lower first switching element. In a similar manner, the delay circuit can create the dead time period between a falling edge of the second pulse signal and a rising edge of the inverted second pulse signal. Therefore, the through current can be prevented from flowing from the upper second switching element to the lower second switching element.

In the signal transmitting apparatus disclosed in the present application, the signal transmitting apparatus may further comprise a lower first current path that is connected in parallel to the lower first switching element, and a lower second current path that is connected in parallel to the lower second switching element. Impedance of the lower first current path may be higher than impedance of the lower first switching element that is in an on-state. Impedance of the lower second current path may be higher than impedance of the lower second switching element that is in an on-state.

The lower first current path constantly connects the first terminal of the sending coil to the power supply terminal of the low reference voltage. In addition, the lower second current path constantly connects the second terminal of the sending coil to the power supply terminal of the low reference voltage. Therefore, even during a period in which the lower first switching element and the lower second switching element are turned off, both the first terminal and the second terminal of the sending coil can be constantly maintained in a low impedance state. Consequently, the noise voltage due to the common mode voltage can be prevented from being generated on the side of the receiving coil over an entire operation period of the signal transmitting apparatus.

In addition, impedance of the lower first current path is set higher than impedance of the lower first switching element that is in an on-state, and impedance of the lower second current path is set higher than impedance of the lower second switching element that is in an on-state. Consequently, a value of the through current flowing from the upper first switching element through the lower first current path and a value of the through current flowing from the upper second switching element through the lower second current path can be sufficiently reduced.

In the signal transmitting apparatus disclosed in the present application, each of the lower first switching element, the lower second switching element, the lower first current path and the lower second current path may comprise an NMOS transistor. A size of the NMOS transistor in the lower first current path may be smaller than a size of the NMOS transistor in the lower first switching element. A size of the NMOS transistor in the lower second current path may be smaller than a size of the NMOS transistor in the lower second switching element. The switching element controlling module may control the NMOS transistors in the lower first current path and the lower second current path in an on-state at all times.

The lower first current path and the lower second current path may be formed by transistors. Therefore, since a high-impedance current path need not be separately created, circuit design and manufacturing processes may be simplified. In addition, the impedance of the NMOS transistor in the lower first current path that is in the on-state is set higher than the impedance of the NMOS transistor in the lower first switching element that is in the on-state. Furthermore, the impedance of the NMOS transistor in the lower second current path that is in the on-state is set higher than the impedance of the NMOS transistor in the lower second switching element that is in the on-state. Consequently, the value of the through current flowing from the upper first switching element through the lower first current path and the value of the through current flowing from the upper second switching element through the lower second current path may be sufficiently reduced.

In the signal transmitting apparatus disclosed in the present application, each of the lower first switching element, the lower second switching element, the lower first current path and the lower second current path may comprise an NMOS transistor. The lower first current path may further comprise a first resistive element connected to a drain terminal of the NMOS transistor of the lower first current path. The lower second current path may further comprise a second resistive element connected to a drain terminal of the NMOS transistor of the lower second current path. The switching element controlling module may control the NMOS transistors in the lower first current path and the lower second current path in an on-state at all times.

By connecting the resistive elements to the drain terminals of the NMOS transistors in the lower first current path and the lower second current path, the impedance of the NMOS transistors in the on-state can be increased. Consequently, a value of the through current flowing from the upper first switching element through the lower first current path and a value of the through current flowing from the upper second switching element through the lower second current path can be sufficiently reduced.

In the signal transmitting apparatus disclosed in the present application, the signal transmitting apparatus may further comprise a parallel first switching element that is connected in parallel to the upper first switching element, and a parallel second switching element that is connected in parallel to the upper second switching element. In the first control, the switching element controlling module may turn on the upper first switching element and the parallel first switching element at the same time, and then turn off the upper first switching element and the parallel first switching element at different timings. In the second control, the switching element controlling module may turn on the upper second switching element and the parallel second switching element at the same time, and then turn off the upper second switching element and the parallel second switching element at different timings.

A receiving coil voltage is proportional to a time rate of change (di/dt) of a current flowing through the sending coil. In addition, in the first control, the upper first switching element and the parallel first switching element are controlled so as to be turned on at the same time when entering the on-state and turned off at different timings when entering the off-state. In a similar manner, in the second control, the upper second switching element and the parallel second switching element are controlled so as to be turned on at the same time when entering the on-state and turned off at different timings when entering the off-state. As a result, the time rate of change of a current flowing through the sending coil may be controlled so that a rate of decrease in an off-state is reduced with respect to a rate of increase in an on-state. Accordingly, an amplitude value of a pulse voltage that is generated in the receiving coil in response to the on-state of the switching element may be increased in comparison to an amplitude value of a pulse voltage that is generated in the receiving coil in response to the off-state of the switching element. Therefore, the on-state of the switching element may be more easily detected at the receiving coil.

Furthermore, when controlling the time rate of change of the current flowing through the sending coil by gradually turning off the switching element, a midpoint voltage of on/off voltages of the switching element must be used. Since the midpoint voltage is a state in which the switching element is unstable, noise may be generated and a signal may be erroneously transmitted. On the other hand, since the control of gradually turning off the switching element need not be performed with the signal transmitting apparatus according to the present application, the midpoint voltage of on/off voltages of the switching element need not be used. Accordingly, since control of the time rate of change of the current flowing through the sending coil may be realized in the state in which the switching element is stable, generation of noise may be suppressed.

In the signal transmitting apparatus disclosed in the present application, each of the upper first switching element, the parallel first switching element, the upper second switching element and the parallel second switching element may comprise a PMOS transistor. A size of the PMOS transistor in the parallel first switching element may be smaller than a size of the PMOS transistor in the upper first switching element. A size of the PMOS transistor in the parallel second switching element may be smaller than a size of the PMOS transistor in the upper second switching element. In the first control, the switching element controlling module may turn off the upper first switching element after the parallel first switching element is turned off. In the second control, the switching element controlling module may turn off the upper second switching element after the parallel second switching element is turned off.

The size of the transistor in the upper first switching element is set larger than the size of the transistor in the parallel first switching element. In addition, the parallel first switching element is turned off first and then the upper first switching element is turned off. In a similar manner, the size of the transistor in the upper second switching element is set larger than the size of the transistor in the parallel second switching element. Furthermore, the parallel second switching element is turned off first and then the upper second switching element is turned off. Consequently, the time rate of change of the current flowing through the sending coil may be controlled so that a rate of decrease in the off-state is reduced with respect to a rate of increase in the on-state.

In the signal transmitting apparatus disclosed in the present application, a number of coil windings of the receiving coil may be larger than a number of coil windings of the sending coil.

A deterioration of a coupling coefficient due to downsizing of the transformer causes a deterioration of the signal component and makes signal transmission more difficult, in consideration thereof, with the signal transmitting apparatus according to the present application, by increasing a number of coil windings of the receiving coil, inductance of the receiving coil may be increased and the signal component may be increased. Therefore, downsizing of the transformer may be realized and a cost of the signal transmitting apparatus may be reduced. Moreover, increasing the number of coil windings of the receiving roil increases the series resistance component which, in turn, increases the noise voltage. However, in the signal transmitting apparatus according to the present application, since generation of a noise voltage itself may be suppressed, the number of coil windings of the receiving coil can be increased.

Effect of the Invention

According to the present application, in a signal transmitting apparatus which transmits a signal inputted to a sending circuit to a receiving circuit that is insulated electrically from the sending circuit, generation of the noise voltage attributable to the common mode voltage can be suppressed.

DETAILED DESCRIPTION OF INVENTION

Primary characteristics of embodiments will be listed below.

(First mode) A switching element controlling module may perform control so as to generate a coil current flowing through a sending coil in a first direction by turning on an upper first switching element and a lower second switching element and turning off an upper second switching element and a lower first switching element, and to subsequently turn on the upper second switching element in response to turning of the lower second switching element. In addition, the switching element controlling module may also perform control so as to generate a aril current flowing through the sending coil in a second direction by turning off the upper first switching element and the lower second switching element and turning on the upper second switching element and the lower first switching element, and to subsequently turn on the upper first switching element in response to turning off the lower first switching element. The object of setting voltages of both terminals of the sending coil to low impedance can also be achieved by this configuration.

First Embodiment

Figure 1:
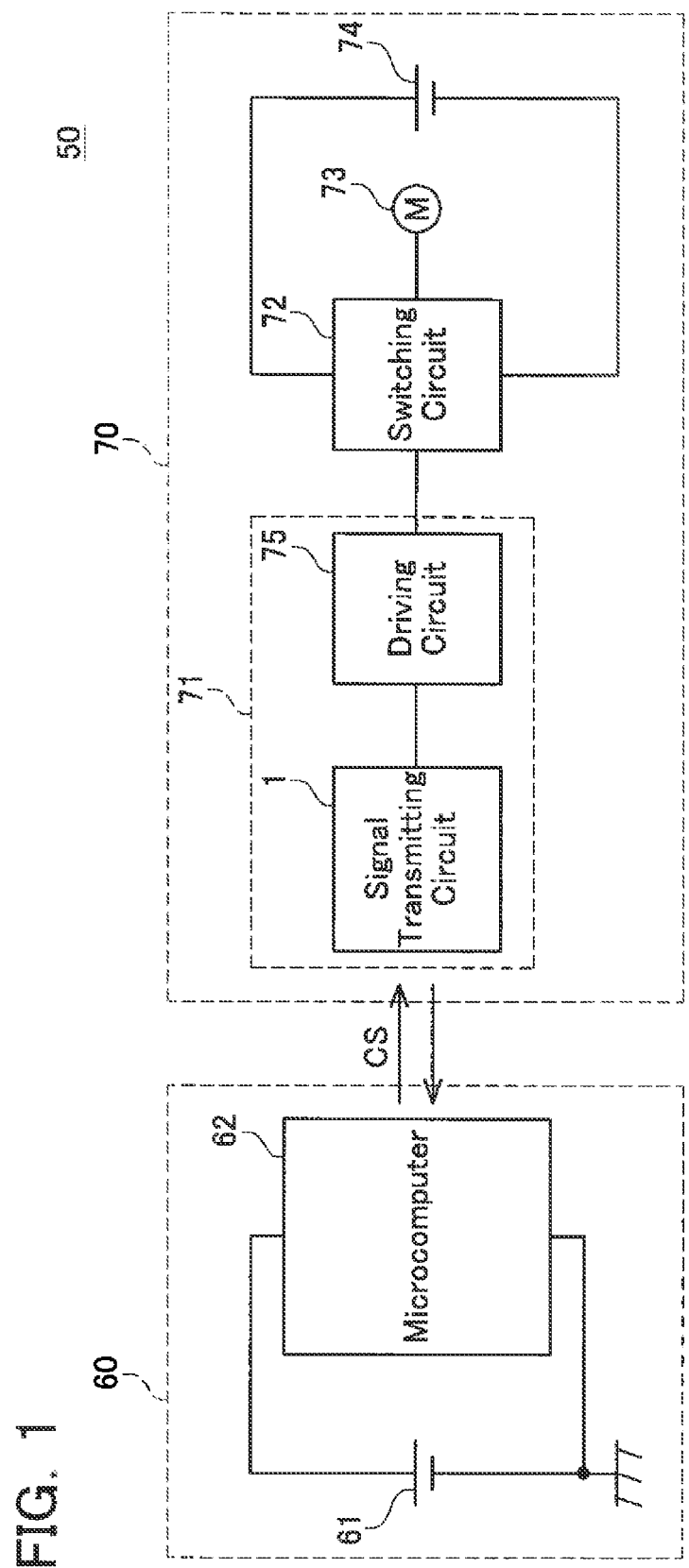
FIG. 1 is a circuit diagram of a motor drive system according to a first embodiment.

A first embodiment of the present application will be described with reference to the drawings. FIG. 1 shows a motor drive system 50. The motor drive system 50 comprises a low voltage system circuit 60 and a high voltage system circuit 70. The low voltage system circuit 60 and the high voltage system circuit 70 are insulated from each other. The low voltage system circuit 60 comprises a low-voltage battery 61 and a microcomputer 62. The microcomputer 62 outputs a control signal CS. The control signal CS is a signal for controlling switching operations of a switching circuit 72.

The high voltage system circuit 70 comprises a control circuit 71, the switching circuit 72, a motor 73, and a high-voltage battery 74. The control circuit 71 comprises a signal transmitting circuit 1 and a driving circuit 75. The signal transmitting circuit 1 is a circuit comprising an isolated signal device. The signal transmitting circuit 1 transmits the control signal CS outputted from the microcomputer 62 to the driving circuit 75 while maintaining an insulated state. In addition, the control circuit 71 is formed as an integrated IC by using a small-sized device such as an on-chip transformer as the isolated signal device. Therefore, downsizing and cost reduction are achieved. In response to the control signal CS, the driving circuit 75 drives the switching circuit 72. Accordingly, rotation of the motor 73 is controlled.

Figure 2:
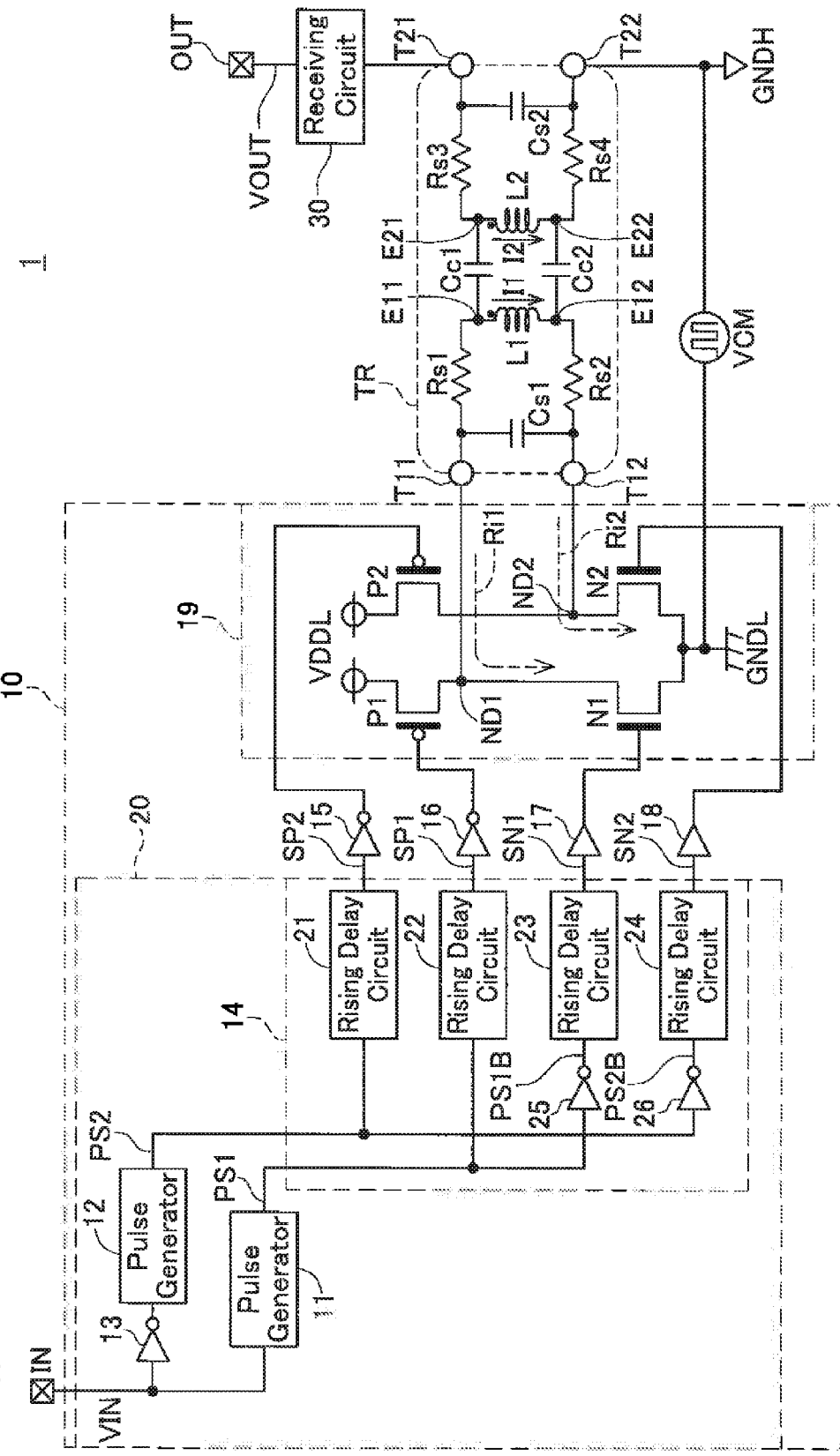
FIG. 2 is a circuit diagram of a signal transmitting circuit according to a first embodiment.

FIG. 2 shows a detailed circuit diagram of the signal transmitting circuit 1. The signal transmitting circuit 1 comprises an input terminal IN, a sending circuit 10, a transformer TR, a receiving circuit 30, and an output terminal OUT. The sending circuit 10 and the receiving circuit 30 are insulated by the transformer TR. In addition, a ground voltage GNDL of the sending circuit 10 and a ground voltage GNDH of the transformer TR are separated from each other. An input voltage VIN is inputted to the input terminal IN and an output voltage VOUT is outputted from the output terminal OUT.

The sending circuit 10 comprises a switching element controlling circuit 20, inverters 15 and 16, buffers 17 and 18, and an H-bridge circuit 19. The switching element controlling circuit 20 will now be described. The switching element controlling circuit 20 comprises pulse generators 11 and 12, an inverter 13, and a delay controlling circuit 14. The input voltage VIN is inputted to the pulse generator 11 and a pulse signal PS1 is outputted from the pulse generator 11. The input voltage VIN inverted by the inverter 13 is inputted to the pulse generator 12 and a pulse signal PS2 is outputted from the pulse generator 12.

The delay controlling circuit 14 comprises rising delay circuits 21 to 24 and inverters 25 and 26. The pulse signal PS2 is inputted to the rising delay circuit 21 and a gate controlling signal SP2 is outputted from the rising delay circuit 21. The pulse signal PS1 is inputted to the rising delay circuit 22 and a gate controlling signal SP1 is outputted from the rising delay circuit 22. The pulse signal PS1 is inputted to the inverter 25 and an inverted pulse signal PS1B is outputted from the inverter 25. The inverted pulse signal PS1B is inputted to the rising delay circuit 23 and a gate controlling signal SN1 is outputted from the rising delay circuit 23. The pulse signal PS2 is inputted to the inverter 26 and an inverted pulse signal PS2B is outputted from the inverter 26. The inverted pulse signal PS2B is inputted to the rising delay circuit 24 and a gate controlling signal SN2 is outputted from the rising delay circuit 24.

Figure 3:
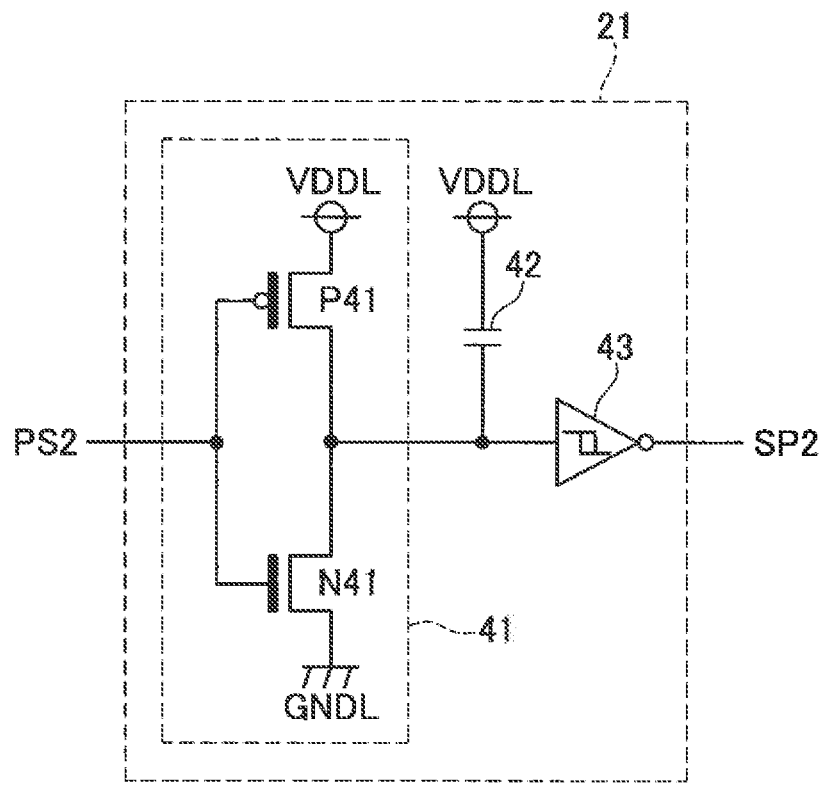
FIG. 3 is a circuit diagram of a rising delay circuit according to a first embodiment.

FIG. 3 shows a block diagram of the rising delay circuit 21. The rising delay circuit 21 comprises an inverter 41, a capacitor 42, and a Schmitt trigger inverter 43. The inverter 41 comprises a transistor P41 that is a PMOS transistor and a transistor N41 that is an NMOS transistor. A gate terminal of the transistor P41 and a gate terminal of the transistor N41 are commonly connected and are arranged as input terminals. A supply voltage VDDL is inputted to a source terminal of the transistor P41. A ground voltage GNDL is inputted to a source terminal of the transistor N41. A drain terminal of the transistor P41 and a drain terminal of the transistor N41 are commonly connected and are arranged as output terminals. In addition, a size of the transistor P41 is set larger than a size of the transistor N41. Therefore, impedance of the transistor P41 in an on-state is set lower than impedance of the transistor N41 in an on-state.

The pulse signal PS2 is inputted to an input terminal of the inverter 41. An output terminal of the inverter 41 and an input terminal of the Schmitt trigger inverter 43 are connected to a first terminal of the capacitor 42. The supply voltage VDDL is inputted to a second terminal of the capacitor 42. The gate controlling signal SP2 is outputted from the Schmitt trigger inverter 43.

Figure 4:
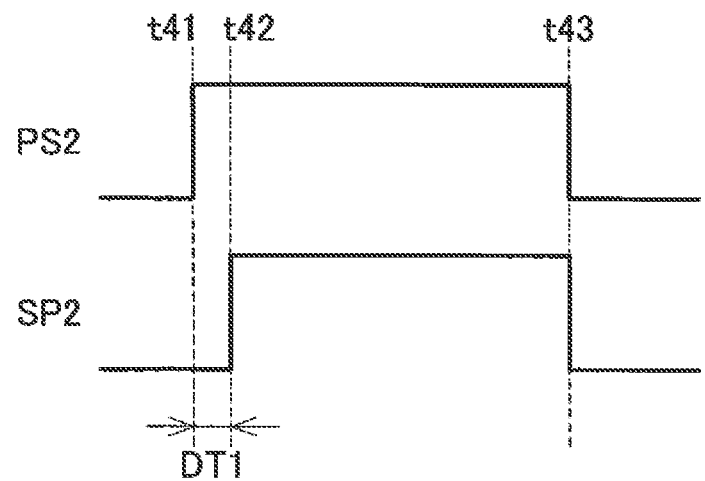
FIG. 4 is an operational waveform diagram of a rising delay circuit according to a first embodiment.

FIG. 4 shows an operational waveform diagram of the rising delay circuit 21. At time t41, as the pulse signal PS2 transitions from a low level to a high level, an output of the inverter 41 transitions from a high level to a low level. Consequently, the capacitor 42 is discharged through a current path constituted by the capacitor 42, the transistor N41, and the ground voltage GNDL. Subsequently, when an output voltage of the capacitor 42 drops below a threshold voltage of the Schmitt trigger inverter 43, at time t42, the gate controlling signal SP2 transitions from a low level to a high level.

In a similar manner, at time t43, as the pulse signal PS2 transitions from a high level to a low level, an output of the inverter 41 transitions from a low level to a high level. Consequently, the capacitor 42 is charged through a current path constituted by the supply voltage VDDL, the transistor P41, and the capacitor 42. Subsequently, when an output voltage of the capacitor 42 rises above the threshold voltage of the Schmitt trigger inverter 43, at time t43, the gate controlling signal SP2 transitions from a high level to a low level.

Moreover, impedance of the transistor P41 in the on-state is set lower than impedance of the transistor N41 in an on-state. Therefore, a discharge period of the capacitor 42 can be set longer than a charge period of the capacitor 42. Accordingly, the rising delay circuit 21 can perform an operation in which only a rising edge of the pulse signal PS2 is outputted delayed by a delay time DT1 while a falling edge of the pulse signal PS2 is outputted without delay. Moreover, a length of the delay time DT1 can be set to any value by adjusting a resistance value of the transistor N41 and a capacitance value of the capacitor 42. Since configurations of the rising delay circuits 22 to 24 are similar to that of the rising delay circuit 21, a detailed description will be omitted herein.

The H-bridge circuit 19 (FIG. 2) comprises transistors P1, P2, N1, and N2. The transistors P1 and P2 are PMOS transistors and the transistors N1 and N2 are NMOS transistors. A drain terminal of the transistor P1 is connected to a first input terminal T11 of the transformer TR. The supply voltage VDDL is inputted to a source terminal of the transistor P1. The gate controlling signal SP1 inverted by the inverter 16 is inputted to a gate terminal of the transistor P1. The transistor P1 enters the on-state when the gate controlling signal SP1 is at a high level and enters an off-state when the gate controlling signal SP1 is at a low level. A drain terminal of the transistor N1 is connected to the first input terminal T11 of the transformer TR. The ground voltage GNDL is inputted to a source terminal of the transistor N1. The gate controlling signal SN1 is inputted to a gate terminal of the transistor N1 via the buffer 17. The transistor N1 enters the on-state when the gate controlling signal SN1 is at the high level and enters an off-state when the gate controlling signal SN1 is at the low level.

A drain terminal of the transistor P2 is connected to a second input terminal T12 of the transformer TR. The supply voltage VDDL is inputted to a source terminal of the transistor P2. The gate controlling signal SP2 inverted by the inverter 15 is inputted to a gate terminal of the transistor P2. The transistor P2 enters the on-state when the gate controlling signal SP2 is at the high level and enters the off-state when the gate controlling signal SP2 is the a low level. A drain terminal of the transistor N2 is connected to the second input terminal T12 of the transformer TR. The ground voltage GNDL is inputted to a source terminal of the transistor N2. The gate controlling signal SN2 is inputted to a gate terminal of the transistor N2 via the buffer 18. The transistor N2 enters the on-state when the gate controlling signal SN2 is at the high level and enters the off-state when the gate controlling signal SN2 is at the low level. In addition, a drain terminal of the transistor P1 and a drain terminal of the transistor N1 are connected by a node ND1. In a similar manner, a drain terminal of the transistor P2 and a drain terminal of the transistor N2 are connected by a node ND2.

The transformer TR will be described. The transformer TR shown in FIG. 2 is an equivalent circuit. The transformer TR comprises a sending coil L1 and a receiving coil L2. The sending coil L1 and the receiving coil L2 are insulated electrically. In addition, a number of coil windings of the receiving coil L2 is set larger than a number of coil windings of the sending coil L1. The node ND1 is connected to the first input terminal T11 of the transformer TR and the node ND2 is connected to the second input terminal T12 of the transformer TR. Furthermore, the receiving circuit 30 is connected to a first output terminal T21 of the transformer TR. In addition, a ground voltage GNDH is supplied to a second output terminal T22. Moreover, a current flowing through the sending coil L1 is defined as a coil current I1 and a current flowing through the receiving coil L2 is defined as a coil current I2.

A series resistance component Rs1 exists in a connection path of a first terminal E11 of the sending coil L1 and the first input terminal T11. A series resistance component Rs2 exists in a connection path of a second terminal E12 and the second input terminal T12. In a similar manner, a series resistance component Rs3 exists in a connection path of a first terminal E21 the receiving coil L2 and the first output terminal T21. A series resistance component Rs4 exists in a connection path of a second terminal E22 and the second output terminal T22. In addition, a parasitic capacitance Cc1 exists between the first terminal E11 of the sending coil L1 and the first terminal E21 of the receiving coil L2. A parasitic capacitance Cc2 exists between the second terminal E12 of the sending coil L1 and the second terminal E22 of the receiving coil L2. Furthermore, a distributed capacitance Cs1 exists between wirings of the sending coil L1 and a distributed capacitance Cs2 exists between wirings of the receiving coil L2. In this case, each of capacitance values of the parasitic capacitances Cc1 and Cc2 is defined as a capacitance C. In addition, each of resistance values of the series resistance components Rs3 and Rs4 is defined as a resistance R.

Figure 5:
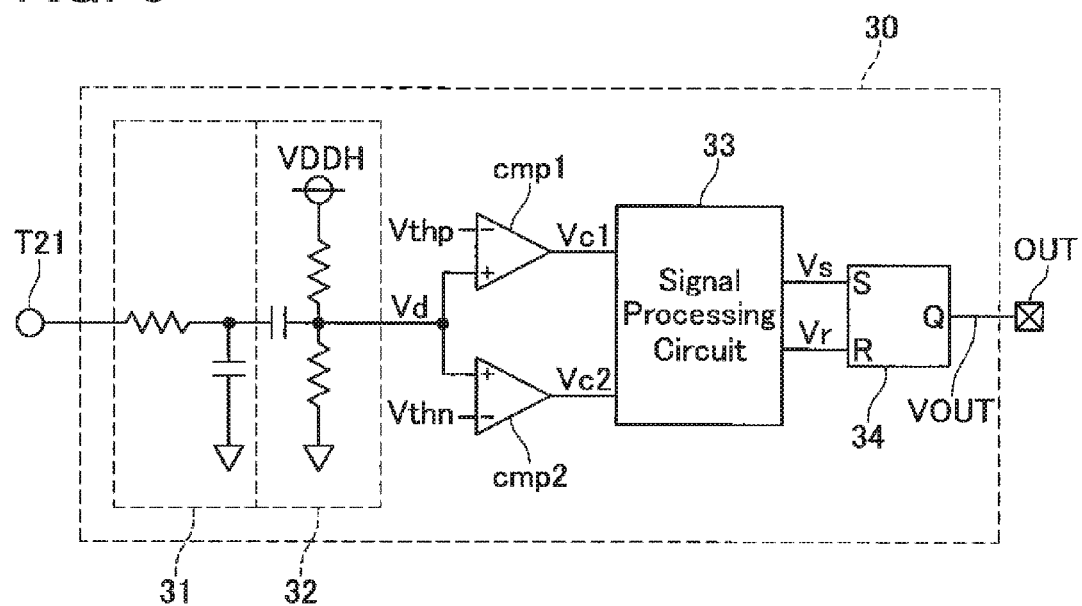
FIG. 5 is a circuit diagram of a receiving circuit according to a first embodiment.

FIG. 5 shows the receiving circuit 30. The receiving circuit 30 comprises a low pass filter 31, a high pass filter 32, comparators cmp1 and cmp2, a signal processing circuit 33, and an RS flip flop 34. The first output terminal T21 of the transformer TR is connected to an input terminal of the low pass filter 31. An output terminal of the low pass filter 31 is connected to an input terminal of the high pass filter 32. A receiving coil voltage Vd is outputted from an output terminal of the high pass filter 32. The receiving coil voltage Vd is inputted to a non-inverting input terminal of the comparator cmp1, a threshold Vthp is inputted to an inverting input terminal of the comparator cmp1, and an output signal Vc1 is outputted from an output terminal of the comparator cmp1. In addition, the receiving coil voltage Vd is inputted to a non-inverting input terminal of the comparator cmp2, a threshold Vthn is inputted to an inverting input terminal of the comparator cmp2, and an output signal Vc2 is outputted from an output terminal of the comparator cmp2.

The output signals Vc1 and Vc2 are inputted to the signal processing circuit 33, and a pulse signal Vs and a pulse signal Vr are outputted from the signal processing circuit 33. The signal processing circuit 33 is a circuit that detects a rising edge and a falling edge of the input voltage VIN. Specifically, a case in which the output signals Vc1 and Vc2 are inputted in succession to the signal processing circuit 33 with the output signal Vc1 inputted first and the output signal Vc2 inputted second is determined to be a case in which the coil current I1 is generated in a positive direction (in FIG. 2, a direction coinciding with an arrow of the coil current I1). Therefore, a determination is made that the rising edge of the input voltage VIN has been inputted to the sending circuit 10 and the pulse signal Vs is outputted from the signal processing circuit 33. In addition, a case in which the output signals Vc1 and Vc2 are inputted in succession to the signal processing circuit 33 with the output signal Vc2 inputted first and the output signal Vc1 inputted second is determined to be a case in which the coil current I1 is generated in a negative direction (in FIG. 2, a direction opposite to the arrow of the coil current I1). Therefore, a determination is made that the falling edge of the input voltage VIN has been inputted to the sending circuit 10 and the pulse signal Vr is outputted from the signal processing circuit 33.

The pulse signal Vs is inputted to a set terminal of the RS flip flop 34 and the pulse signal Vr is inputted to a reset terminal of the RS flip flop 34. The RS flip flop 34 outputs a high-level output voltage VOUT when the pulse signal Vs is inputted and outputs a low-level output voltage VOUT when the pulse signal Vr is inputted.

Figure 6:
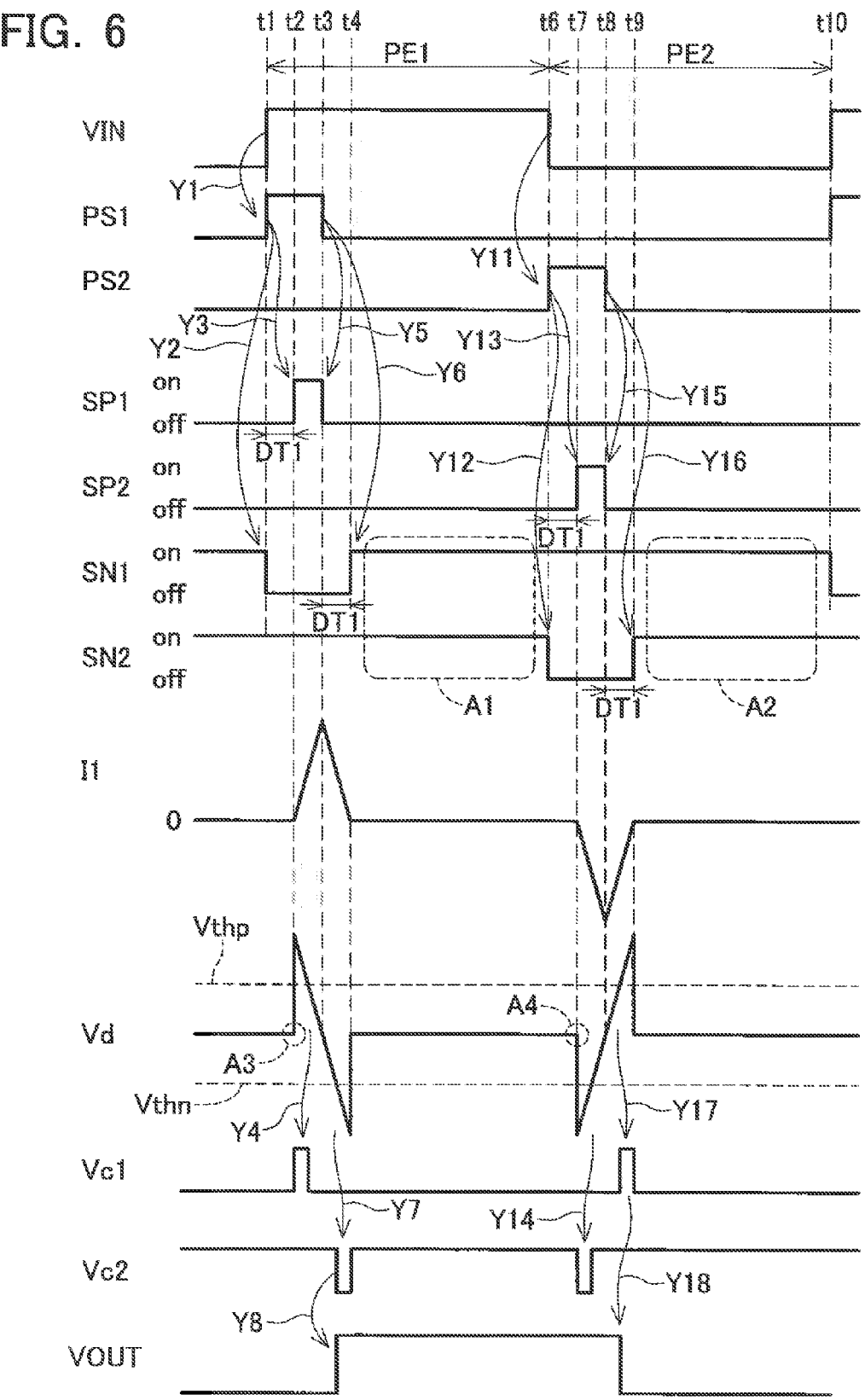
FIG. 6 is an operational waveform diagram of a signal transmitting circuit according to a first embodiment using an operating method according to the present application.

Operations of the signal transmitting circuit 1 will be described using an operational waveform diagram shown in FIG. 6. A period PE1 is a period during which the input voltage VIN is at a high level and a period PE2 is a period during which the input voltage VIN is at a low level.

Operations during the period PE1 will now be described. At time t1, in response to the rising edge of the input voltage VIN, the pulse signal PS1 transitions to a high level (arrow Y1). In response to a rising edge of the pulse signal PS1, the gate controlling signal SN1 transitions to a low level (arrow Y2). Therefore, the transistor N1 is turned off at time t1. In addition, the gate controlling signal SP1 transitions to the high level (arrow Y3) after a delay of a delay time DT1 from the rising edge of the pulse signal PS1. Therefore, the transistor P1 is turned on at time t2. Furthermore, at time t2, the transistor P2 is turned off and the transistor N2 is turned on. Therefore, a current path of the supply voltage VDDL, the transistor P1, the node ND1, the sending coil L1, the node ND2, the transistor N2, and the ground voltage GNDL is formed and the coil current I1 starts to increase in the positive direction. In other words, the coil current I1 in the positive direction flows in accordance with the riding edge of the input voltage VIN.

At the receiving coil L2, a secondary voltage that is proportional to a rate of increase (di/dt) of the coil current I1 is generated by electromagnetic induction. The secondary voltage is inputted to the low pass filter 31 and the high pass filter 32 and noise is removed. The secondary voltage after noise reduction is outputted from the high pass filter 32 as the receiving coil voltage Vd. In addition, during a period in which the receiving coil voltage Vd rises above the threshold Vthp, the output signal Vc1 of the comparator cmp1 has a high level (arrow Y4).

At time t3, in response to a falling edge of the pulse signal PS1, the gate controlling signal SP1 transitions to the low level (arrow Y5). Therefore, at time t3, since the transistor P1 is turned off and the current path is blocked, the coil current I1 starts to decrease. In addition, the gate controlling signal SN1 transitions to the high level (arrow Y6) after a delay of the delay time DT1 from the falling edge of the pulse signal PS1. Therefore, the transistor N1 is turned on at time t4.

The receiving coil voltage Vd that is proportional to a rate of decrease (di/dt) of the coil current I1 is outputted from the high pass filter 32. In addition, during a period in which the receiving coil voltage Vd falls below the threshold Vthn, the output signal Vc2 of the comparator cmp2 has the low level (arrow Y7).

The signal processing circuit 33 (FIG. 5) of the receiving circuit 30 detects that pulses of the output signals Vc1 and Vc2 have been inputted in succession with the pulse of the output signal Vc1 inputted first and the pulse of the output signal Vc2 inputted second. Therefore, a determination is made by the signal processing circuit 33 that a rising edge of the input voltage VIN has been inputted to the sending circuit 10 and the output voltage VOUT is set to the high level (arrow Y8). Accordingly, the rising edge of the input voltage VIN at time t1 is restored as the output voltage VOUT to achieve signal transmission.

In addition, an effect of the delay controlling circuit 14 will be described. The delay controlling circuit 14 forms a dead time period of the delay time DT1 between the falling edge of the gate controlling signal SN1 at time t1 and the rising edge of the gate controlling signal SP1 at time t2. Furthermore, the delay controlling circuit 14 forms a dead time period of the delay time DT1 between the falling edge of the gate controlling signal SP1 at time t3 and the rising edge of the gate controlling signal SN1 at time t4. Since both transistors P1 and N1 are turned off during the dead time periods, a through current can be prevented from flowing from the transistor P1 to the transistor N1.

Next, operations during the period PE2 will now be described. At time t6, in response to the falling edge of the input voltage VIN, the pulse signal PS2 transitions to the high level (arrow Y11). In response to the rising edge of the pulse signal PS2, the gate controlling signal SN2 transitions to the low level (arrow Y12). Therefore, the transistor N2 is turned off at time t6. In addition, the gate controlling signal SP2 transitions to the high level (arrow Y13) after the delay of the delay time DT1 from the rising edge of the pulse signal PS2. Therefore, the transistor P2 is turned on at time t7. Furthermore, at time t7, the transistor P1 is turned off and the transistor N1 is turned on. Therefore, the current path of the supply voltage VDDL, the transistor P2, the node ND2, the sending coil L1, the node ND1, the transistor N1, and the ground voltage GNDL is formed and the coil current I1 starts to increase in the negative direction. In other words, the coil current I1 in the negative direction flows in accordance with the falling edge of the input voltage VIN.

The receiving coil voltage Vd that is proportional to the rate of increase (di/dt) of the coil current I1 is outputted from the high pass filter 32. In addition, during a period in which the receiving coil voltage Vd fails below the threshold Vthn, the output signal Vc2 of the comparator cmp2 has the low level (arrow Y14).

At time t8, in response to a falling edge of the pulse signal PS2, the gate controlling signal SP2 transitions to a low level (arrow Y15). Therefore, at time t8, since the transistor P2 is turned off and the current path is blocked, the coil current I1 starts to decrease. In addition, the gate controlling signal SN2 transitions to a high level (arrow Y16) after a delay of the delay time DT1 frown the falling edge of the pulse signal PS2. Therefore, the transistor N2 is turned on at time t9.

The receiving coil voltage that is proportional to the rate of decrease (di/dt) of the coil current I1 is outputted from the high pass filter 32. In addition, during a period in which the receiving coil voltage Vd rises above the threshold Vthp, the output signal Vc1 of the comparator cmp1 has a high level (arrow Y17).

The signal processing circuit 33 (FIG. 5) of the receiving circuit 30 detects that pulses of the output signals Vc2 and Vc1 have been inputted in succession with the pulse of the output signal Vc2 inputted first and the pulse of the output signal Vc1 inputted second. Therefore, a determination is made by the signal processing circuit 33 that the falling edge of the input voltage VIN has been inputted to the sending circuit 10 and the output voltage VOUT is set to the low level (arrow Y18). Accordingly, the falling edge of the input voltage VIN at time t6 is restored as the output voltage VOUT to achieve signal transmission.

A first effect of the signal transmitting circuit 1 according to the first embodiment will be described. As an example, a case will be described in which a common mode voltage VCM is applied between a power supply terminal of a sending-side ground voltage GNDL and a power supply terminal of a receiving-side ground voltage GNDH. In addition, a case will be described in which a voltage changing rate of the common mode voltage VCM is (dv/dt). Furthermore, as an example, a case will be described in which a voltage of the sending-side ground voltage GNDL, is lower than a voltage of the receiving-side ground voltage GNDH.

Figure 7:
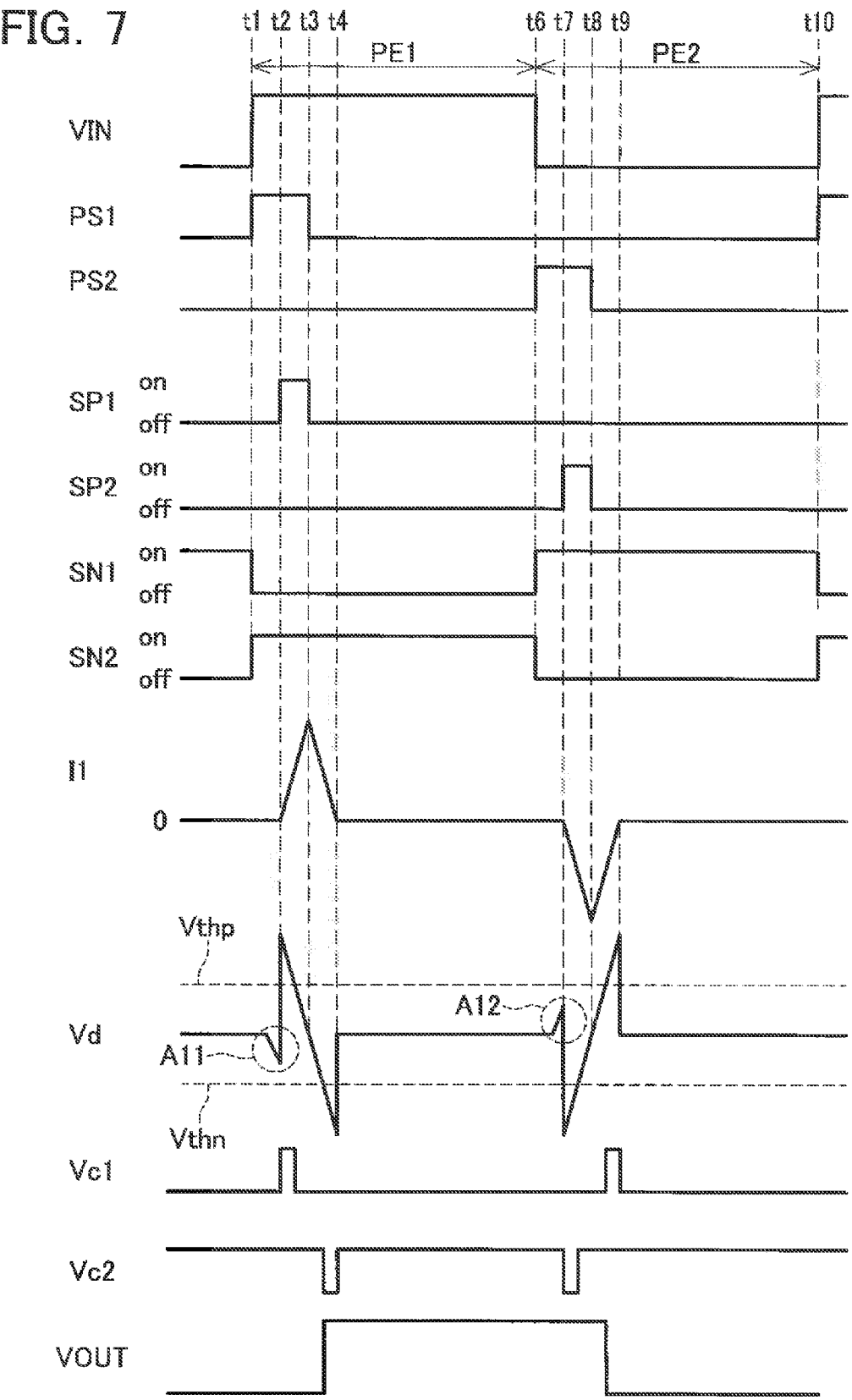
FIG. 7 is an operational waveform diagram of a signal transmitting circuit according to a first embodiment using a general method.

First, for comparison, a general operation method will be described. FIG. 7 is a waveform diagram showing a case in which the signal transmitting circuit 1 is operated by a general method. In the general method, during a period PE1, since the gate controlling signal SN1 is maintained at a low level and the gate controlling signal SN2 is maintained at a high level, the transistor N1 is maintained in an off-state and the transistor N2 is maintained in an on-state. In addition, during a period PE2, since the gate controlling signal SN1 is maintained at a high level and the gate controlling signal SN2 is maintained at a low level, the transistor N1 is maintained in an on-state and the transistor N2 is maintained in an off-state. In other words, with the general method, the transistors N1 and N2 do not enter an on-state (low-impedance state) at the same time.

Furthermore, due to the common mode voltage VCM, a displacement current i (=C×dv/dt) flows through the parasitic capacitances Cc1 and Cc2. During the period PE1, a path through which the displacement current i flows is a path Ri2 Shown in FIG. 2. The path Ri2 is a path from the second terminal E22 of the receiving coil L2 to the ground voltage GNDL via the parasitic capacitance Cc2, the series resistance component Rs2, the second input terminal T12, the node ND2, and the transistor N2. In addition, the path Ri2 is an asymmetric current path with respect to the transformer TR. Moreover, during the period PE2, a path through which the displacement current i flows is a path Ri1 shown in FIG. 2. The path Ri1 is a path from the first terminal E21 of the receiving coil L2 to the ground voltage GNDL via the parasitic capacitance Cc1, the series resistance component Rs1, the first input terminal T11, the node ND1, and the transistor N1. In addition, the path Ri1 is an asymmetric current path with respect to the transformer TR.

Due to the displacement current i flowing through the asymmetric current paths, a noise voltage (=displacement current i×resistance R) is generated on a side of the receiving coil L2 when the input voltage VIN switches between a high level and a low level. Consequently, since the noise voltage is superimposed on the receiving coil voltage Vd (in FIG. 7, area A11 and area A12), a rising edge and a falling edge of the input voltage VIN may be erroneously detected at the receiving circuit 30.

On the other hand, with the operating method according to the present application (FIG. 6), the gate controlling signals SN1 and SN2 are both at a high level and the transistors N1 and N2 are both in an on-state during a period from time t4 to time t6 in the period PE1 (area A1) and a period from time t9 to time t10 in the period PE2 (area A2). During these periods, both voltages of the first terminal E11 and the second terminal E12 of the sending coil L1 are in a low impedance state.

Furthermore, since both the first terminal E11 and the second terminal E11 are in a low impedance state, the displacement current i due to the common mode voltage VCM flows through both routes Ri1 and Ri2. In other words, with the signal transmitting circuit 1 according to the present application, a current path of the displacement current is never limited to one of the paths Ri1 and Ri2 as was the case of the general operating method shown in FIG. 7. Therefore, the current path of the displacement current i can be set symmetrical with respect to the transformer TR. Accordingly, since displacement currents with directions that are opposite to each other flow through both terminals of the receiving coil L2, influences of the displacement currents cancel each other out. Consequently, generation of a noise voltage on the side of the receiving coil L2 can be suppressed (in FIG. 7, area A3 and area A4). As a result, since the noise voltage can be suppressed from being superimposed on the receiving coil voltage Vd, a rising edge and a falling edge of the input voltage VIN can be more accurately detected at the receiving circuit 30.

In addition, a second effect of the signal transmitting circuit 1 according to the first embodiment will be described. A deterioration of a coupling coefficient due to downsizing of the transformer TR causes a deterioration of a received signal component and makes signal transmission more difficult. Therefore, with the signal transmitting circuit 1 according to the first embodiment, by setting a number of coil windings of the receiving coil L2 larger than a number of coil windings of the sending coil L1, an inductance of the receiving coil L2 can be increased and a strength of a received signal can be enhanced. Therefore, downsizing of the transformer TR can be realized and a cost of the signal transmitting circuit 1 can be reduced. Moreover, increasing the number of coil windings of the receiving coil L2 increases series resistance components Rs3 and Rs4 which, in turn, increases a noise voltage attributable to the common mode voltage VCM. However, with the signal transmitting circuit 1 according to the first embodiment, since generation of a noise voltage attributable to the common mode voltage VCM itself can be suppressed, the number of coil windings of the receiving coil L2 can be increased.

Second Embodiment

Figure 8:
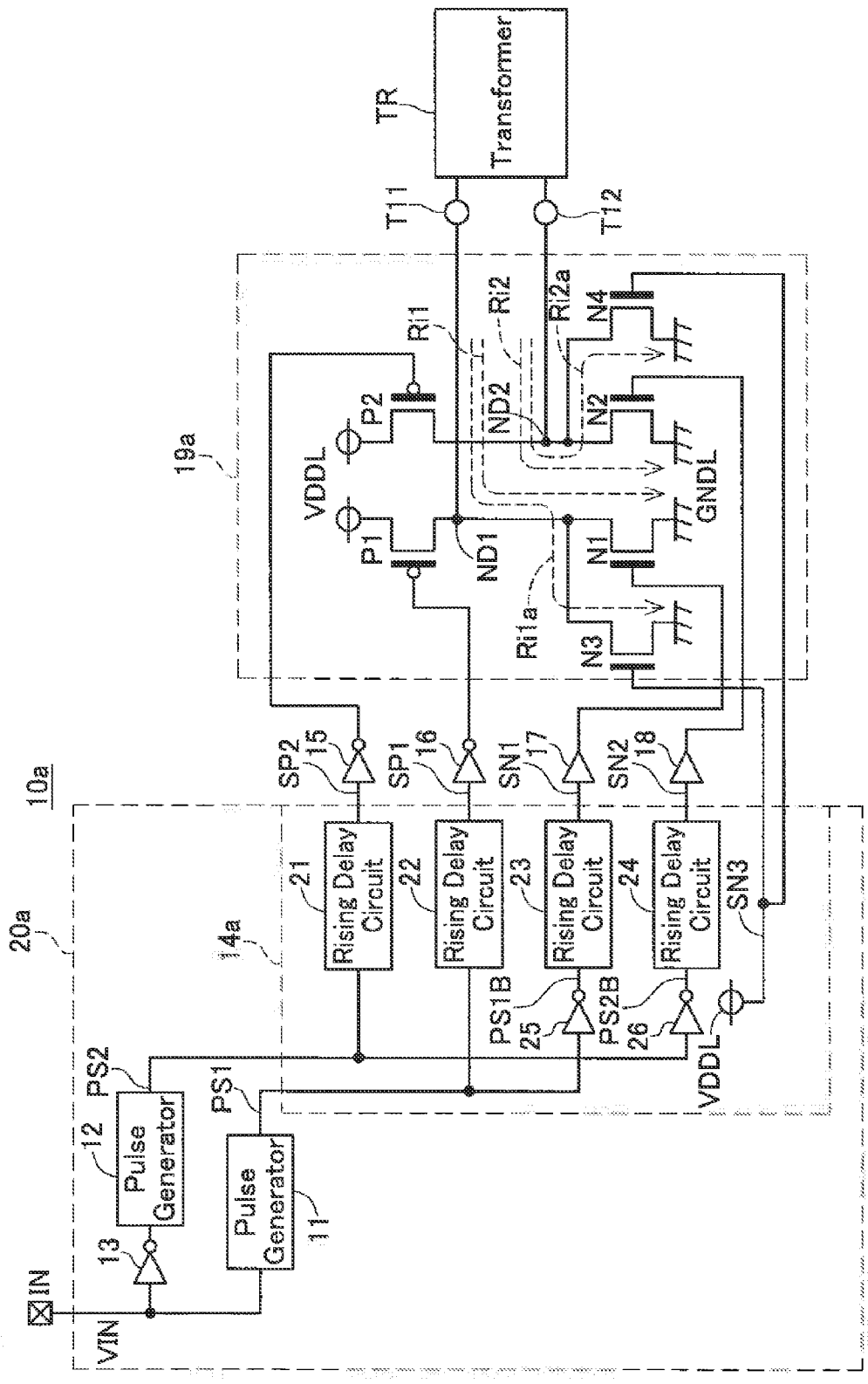
FIG. 8 is a circuit diagram of a sending circuit according to a second embodiment.

A second embodiment of the present application will be described with reference to the drawings. FIG. 8 shows a detailed circuit diagram of a sending circuit 10*a* according to the second embodiment. Since configurations of the transformer TR and the receiving circuit 30 are similar to those of the first embodiment (FIG. 2), a detailed description will be omitted herein.

The sending circuit 10*a* comprises a switching element controlling circuit 20*a*, inverters 15 and 16, buffers 17 and 18, and an H-bridge circuit 19*a*. In addition, the switching element controlling circuit 20*a* comprises pulse generators 11 and 12, an inverter 13, and a delay controlling circuit 14*a*. The delay controlling circuit 14*a* outputs a supply voltage VDDL as a gate controlling signal SN3. Moreover, since other parts of the configuration of the delay controlling circuit 14*a* are similar to those of the delay controlling circuit 14 according to the first embodiment (FIG. 2), a detailed description will be omitted herein.

The H-bridge circuit 19*a* comprises transistors P1 and P2 and transistors N1 to N4. The transistors P1 and P2 are PMOS transistors and the transistors N1 to N4 are NMOS transistors. The H-bridge circuit 19*a* is configured by adding transistors N3 and N4 to the H-bridge circuit 19 according to the first embodiment (FIG. 2).

The transistor N3 is connected in parallel with the transistor N1. A drain terminal of the transistor N3 is connected to a node ND1. A ground voltage GNDL is inputted to a source terminal of the transistor N3 and the gate controlling signal SN3 is inputted to a gate terminal of the transistor N3. The transistor N3 is constantly set to an on-state. The transistor N4 is connected in parallel with the transistor N2. A drain terminal of the transistor N4 is connected to a node ND2. The ground voltage GNDL is inputted to a source terminal of the transistor N4 and the gate controlling signal SN3 is inputted to a gate terminal of the transistor N4. The transistor N4 is constantly set to an on-state.

A size of the transistor N3 is set smaller than a size of the transistor N1. Therefore, impedance of the transistor N3 in the on-state is set higher than impedance of the transistor N1 in the on-state. Accordingly, during a period in which the transistor P1 is in an on-state, a through current flowing from the transistor P1 to the transistor N3 can be reduced. In addition, a size of the transistor N4 is set smaller than a size of the transistor N2. Therefore, impedance of the transistor N4 in the on-state is set higher than impedance of the transistor N2 in the on-state. Accordingly, during a period in which the transistor P2 is in the on-state, a through current flowing from the transistor P2 to the transistor N4 can be reduced.

Moreover, while the smaller the sizes of the transistors N3 and N4, the smaller the through current, a suppression effect of generation of a noise voltage (to be described later) is also reduced. Therefore, the sizes of the transistors N3 and N4 must be determined so as to obtain a balance between a permissible value of the through current and a permissible value of the noise voltage. For example, the sizes of the transistors N3 and N4 are favorably set to approximately $\frac{1}{10}$ to $\frac{1}{50}$ of the sizes of the transistors N1 and N2. Moreover, since other parts of the configuration are similar to those of the H-bridge circuit 19 according to the first embodiment (FIG. 2), a detailed description will be omitted herein.

An effect of the sending circuit 10*a* according to the second embodiment will be described. Driving of the transistors P1 and N1 require a dead time period in which both the transistors P1 and N1 are turned off. This is required in order to prevent a through current from flowing from the transistor P1 to the transistor N1. However, when the transistor N3 is in an off state, a voltage of a first terminal E11 of the sending coil L1 enters a high-impedance state during the dead time period. Consequently, a displacement current i generated during the dead time period only flows through a path Ri2. Since the path Ri2 is an asymmetric current path with respect to the transformer TR, a noise voltage is generated. In a similar manner, driving of the transistors P2 and N2 also require a dead time period in which both the transistors P2 and N2 are turned off. In addition, when the transistor N4 is in an off-state, the displacement current i generated during the dead time period only flows through a path Ri1 and a noise voltage is generated. From the above, it is shown that the longer the dead time period, the more susceptible to noise voltage.

However, with the sending circuit 10*a* according to the second embodiment, transistors N3 and N4 are constantly in an on-state. Therefore, both the first terminal E11 and the second terminal E12 of the sending coil L1 can constantly be kept in a low impedance state. Accordingly, a displacement current i due to a common mode voltage VCM flows through both a path Ri1*a* and a path Ri2*a* (FIG. 8). As a result, since the current path of the displacement current i becomes symmetrical with respect to the transformer TR, the generation of a noise voltage on the side of the receiving coil L2 can be suppressed. Accordingly, the generation of a se voltage attributable to the common mode voltage VCM can be constantly suppressed at the receiving circuit 30. Therefore, a length of a dead time period can be freely set.

Moreover, in the sending circuit 10*a*, the path Ri1*a* is formed by the transistor N3 and the path Ri2*a* is formed by the transistor N4. Accordingly, the paths Ri1*a* and Ri2*a* can be formed using a similar process to a process for forming the transistors N1 and N2. Therefore, since a dedicated process or the like for funning the paths Ri1*a* and Ri2*a* need not be separately prepared, circuit design and manufacturing processes can be simplified.

Third Embodiment

Figure 9:
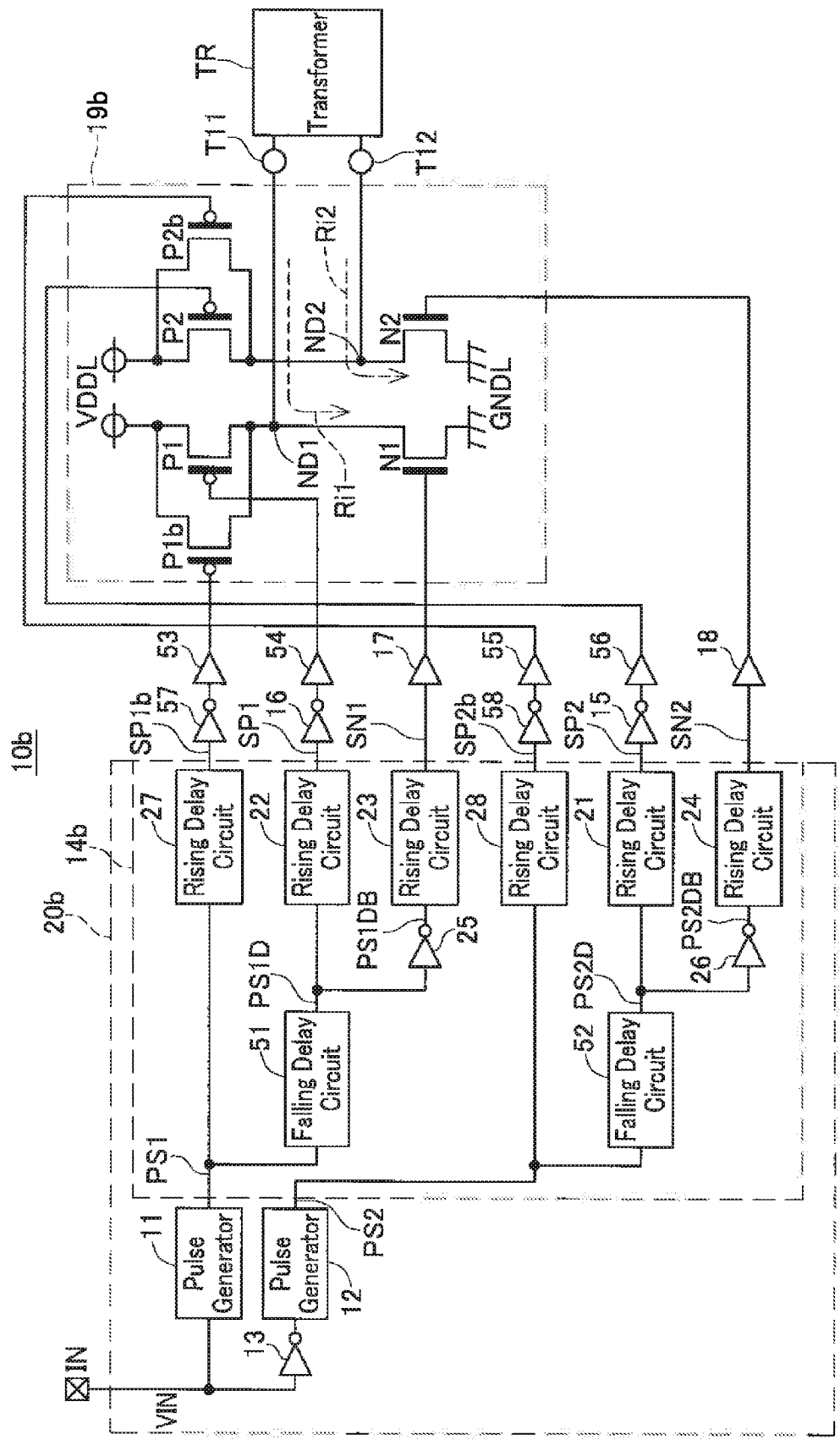
FIG. 9 is a circuit diagram of a sending circuit according to a third embodiment.

A third embodiment of the present application will be described with reference to the drawings. FIG. 9 shows a detailed circuit diagram of a sending circuit 10*b* according to the third embodiment. Since configurations of the transformer TR and the receiving circuit 30 are similar to those of the first embodiment (FIG. 2), a detailed description will be omitted herein.

The sending circuit 10*b* comprises a switching element controlling circuit 20*b*, inverters 15, 16, 57, and 58, buffers 17, 18, and 53 to 56, and an H-bridge circuit 19*b*. In addition, the switching element controlling circuit 20*b* comprises pulse generators 11 and 12, an inverter 13, and a delay controlling circuit 14*b*.

The delay controlling circuit 14*b* comprises rising delay circuits 21 to 24, 27, and 28, falling delay circuits 51 and 52, and inverters 25 and 26.

A pulse signal PS1 is inputted to the rising delay circuit 27 and a gate controlling signal SP1*b* is outputted from the rising delay circuit 27. The pulse signal PS1 is inputted to the falling delay circuit 51 and a delayed pulse signal PS1D is outputted from the falling delay circuit 51. The delayed pulse signal PS1D is inputted to the rising delay circuit 22 and a gate controlling signal SP1 is outputted from the rising delay circuit 22. The delayed pulse signal PS1D is inputted to the inverter 25 and an inverted delayed pulse signal PS1DB is outputted from the inverter 25. The inverted delayed pulse signal PS1DB is inputted to the rising delay circuit 23 and a gate controlling signal SN1 is outputted from the rising delay circuit 23.

In addition, a pulse signal PS2 is inputted to the rising delay circuit 28 and a gate controlling signal SP2b is outputted from the rising delay circuit 28. The pulse signal PS2 is inputted to the falling delay circuit 52 and a delayed pulse signal PS2D is outputted from the falling delay circuit 52. The delayed pulse signal PS2D is inputted to the rising delay circuit 21 and a gate controlling signal SP2 is outputted from the rising delay circuit 21. The delayed pulse signal PS2D is inputted to the inverter 26 and an inverted delayed pulse signal PS2DB is outputted from the inverter 26. The inverted delayed pulse signal PS2DB is inputted to the rising delay circuit 24 and a gate controlling signal SN2 is outputted from the rising delay circuit 24.

Figure 10:
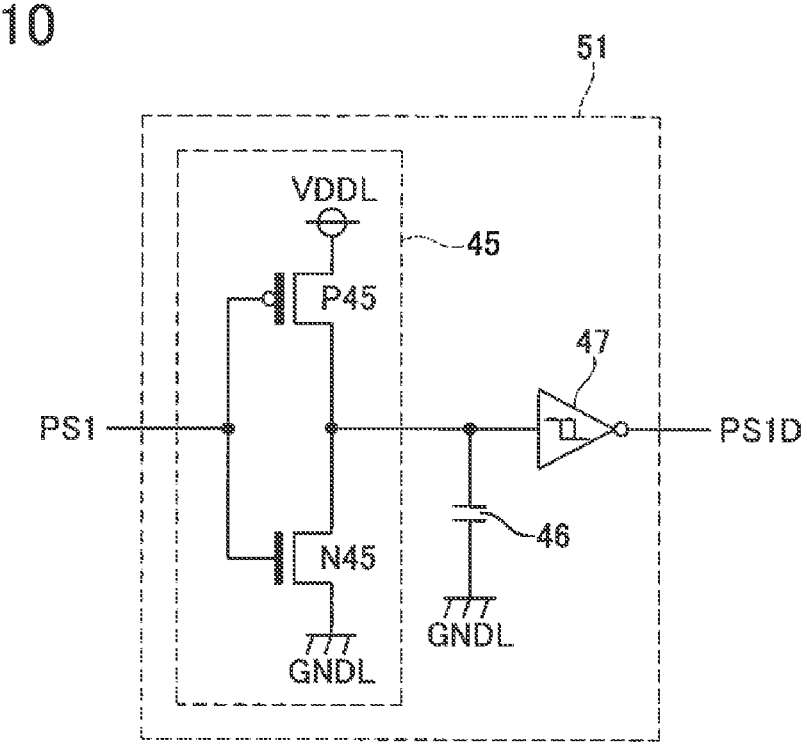
FIG. 10 is a circuit diagram of a falling delay circuit according to a third embodiment.

FIG. 10 shows a block diagram of the falling delay circuit 51. The falling delay circuit 51 comprises an inverter 45, a capacitor 46, and a Schmitt trigger inverter 47. The inverter 45 comprises a transistor P45 that is a PMOS transistor and a transistor N45 that is an NMOS transistor. A size of the transistor N45 is set larger than a size of the transistor P45. Therefore, impedance of the transistor N45 in an on-state is set lower than impedance of the transistor P45 in an on-state.

The pulse signal PS1 is inputted to an input terminal of the inverter 45. An output terminal of the inverter 45 and an input terminal of the Schmitt trigger inverter 47 are connected to a first terminal of the capacitor 46. A ground voltage GNDL is inputted to a second terminal of the capacitor 42. The delayed gate controlling signal PS1D is outputted from the Schmitt trigger inverter 47.

Figure 11:
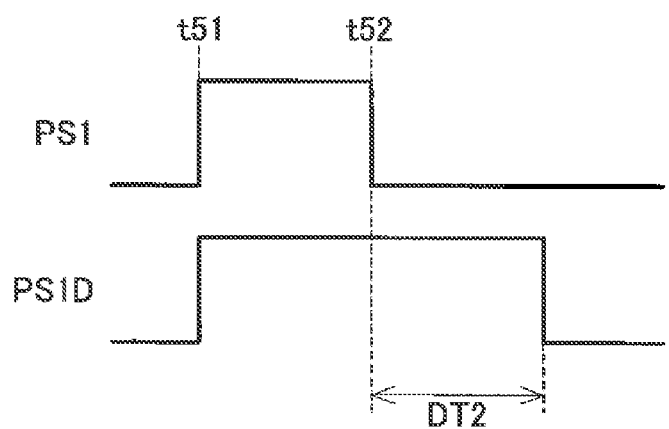
FIG. 11 is an operational waveform diagram of a falling delay circuit according to a third embodiment.

FIG. 11 shows an operational waveform diagram of the falling delay circuit 51. At time t51, as the pulse signal PS1 transitions from a low level to a high level, the capacitor 42 is discharged through a current path constituted by the capacitor 46, the transistor N45, and the ground voltage GNDL. In a similar manner, at time t52, as the pulse signal PS1 transitions from a high level to a low level, the capacitor 46 is charged through a current path constituted by the supply voltage VDDL, the transistor P45, and the capacitor 46.

Furthermore, impedance of the transistor N45 in the on-state is set lower than impedance of the transistor P45 in an on-state. Therefore, a charge period of the capacitor 46 can be set longer than a discharge period of the capacitor 46. Accordingly, the falling delay circuit 51 can perform an operation in which only a falling edge of the pulse signal PS1 is outputted delayed by a delay time DT2 while a rising edge of the pulse signal PS1 is outputted without delay. Moreover, a length of the delay time DT2 can be set to any value by adjusting a resistance value of the transistor P45 and a capacitance value of the capacitor 46. Since a configuration of the falling delay circuit 52 is similar to that of the falling delay circuit 51, a detailed description will be omitted herein. In addition, since other parts of the configuration of the delay controlling circuit 14b are similar to those of the delay controlling circuit 14 according to the first embodiment (FIG. 2), a detailed description will be omitted herein.

The H-bridge circuit 19b (FIG. 9) comprises transistors P1, P2, P1b, P2b, N1, and N2. The transistors P1b and P2b are PMOS transistors. The H-bridge circuit 19b is configured by adding transistors P1b and P2b to the H-bridge circuit 19 according to the first embodiment (FIG. 2).

The transistor P1b is connected in parallel with the transistor P1. A drain terminal of the transistor P1b is connected to a node ND1. The supply voltage VDDL is inputted to a source terminal of the transistor P1b. The gate controlling signal SP1b inverted by the inverter 57 is inputted to a gate terminal of the transistor P1b via the buffer 53. The transistor P1b enters an on-state when the gate controlling signal SP1b is at a high level and enters an off-state when the gate controlling signal SP1b is at a low level. The transistor P2b is connected in parallel with the transistor P2. A drain terminal of the transistor P2b is connected to a node ND2. The supply voltage VDDL is inputted to a source terminal of the transistor P2b. The gate controlling signal SP2b inverted by the inverter 58 is inputted to a gate terminal of the transistor P2b via the buffer 55.

A size of the transistor P1b is set smaller than a size of the transistor P1. Therefore, impedance of the transistor P1b in the on-state is set higher than impedance of the transistor P1 in the on-state. In a similar manner, a size of the transistor P2b is set smaller than a size of the transistor P2. Therefore, impedance of the transistor P2b in the on-state is set higher than impedance of the transistor P2 in the on-state. Moreover, since other parts of the configuration of the H-bridge circuit 19b are similar to those of the H-bridge circuit 19 according to the first embodiment (FIG. 2), a detailed description will be omitted herein.

Figure 12:
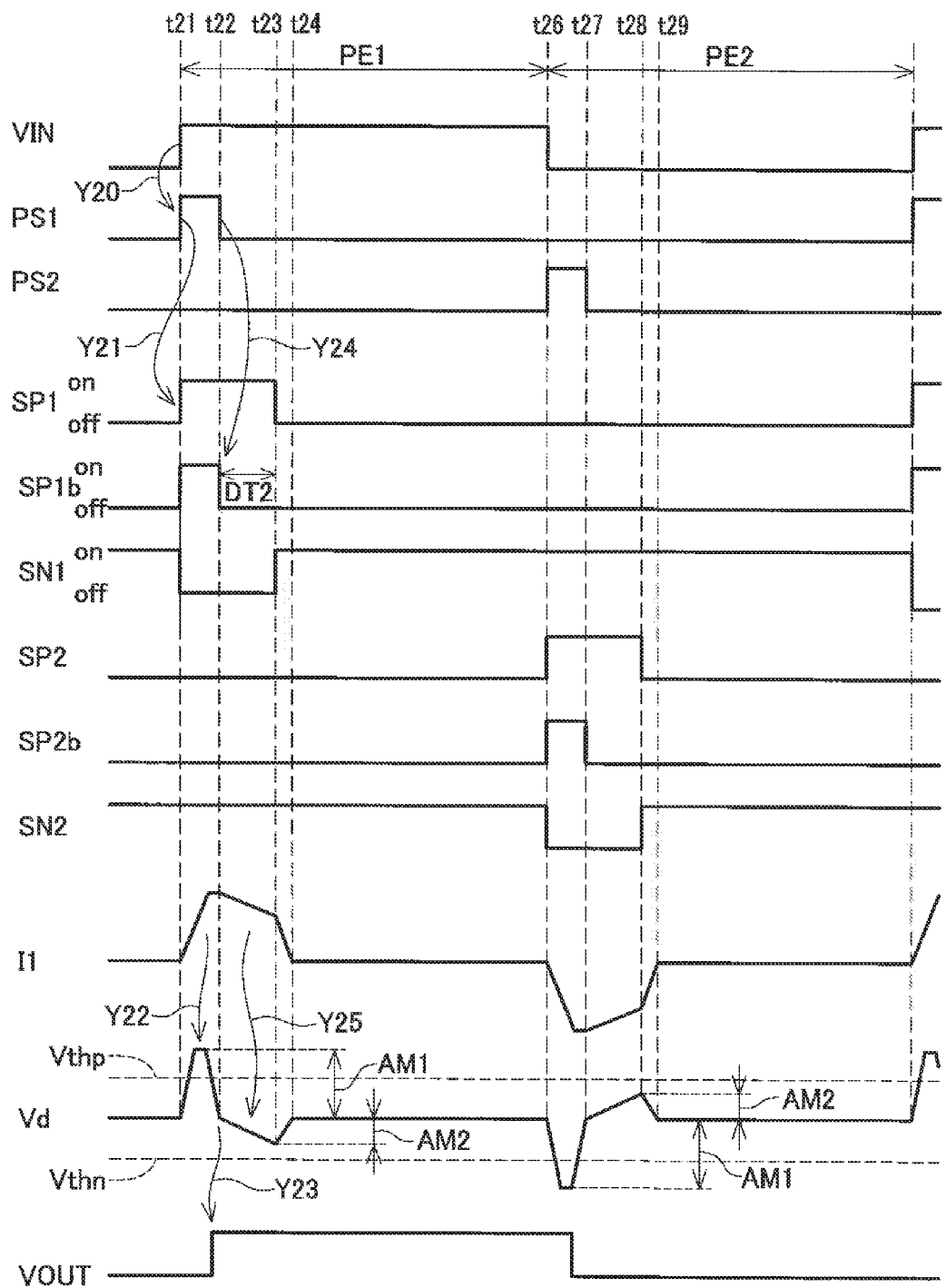
FIG. 12 is an operational waveform diagram of a sending circuit according to a third embodiment.

Operations of the sending circuit 10b will be described using an operational waveform diagram shown in FIG. 12. A period PE1 is a period during which an input voltage VIN is at a high level and a period PE2 is a period during which the input voltage VIN is at a low level. Moreover, a dead time period of a delay time D11 is formed by the rising delay circuits 21 to 24, 27, and 28 of the delay controlling circuit 14b. A mechanism of a formation of the dead time period is similar to the mechanism described in the first embodiment. Therefore, for the sake of simplicity, a description of the dead time period will be omitted in the description of FIG. 12.

Operations during the period PE1 will now be described. At time t21, in response to a rising edge of the input voltage VIN, the pulse signal PS1 transitions to a high level (arrow Y20). In response to a rising edge of the pulse signal PS1, the gate controlling signals SP1 and SP1b transition to a high level at the same time (arrow Y21). Therefore, the transistors P1 and P1b are turned on. In addition, in response to a rising edge of the pulse signal PS1, the gate controlling signal SN1 transitions to a low level. Therefore, the transistor N1 is turned off. Accordingly, a first current path via the transistor P1 and a second current path via the transistor P1b are formed. The first current path is a path from the supply voltage VDDL, to the ground voltage GNDL via the transistor P1, the node ND1, the transformer TR, the node ND2, and the transistor N2. In addition, the second current path is a path from the supply voltage VDDL to the ground voltage GNDL via the transistor P1b, the node ND1, the transformer TR, the node ND2, and the transistor N2. Furthermore, a coil current I1 flows through both the first current path and the second current path. At this point, since the coil current I1 flows through two paths, joint impedance of the current paths is in a low state. Therefore, a rate of increase (di/dt) of the coil current I1 increases.

At a receiving coil L2, a receiving coil voltage Vd is obtained (arrow Y22) in proportion to the rate of increase of the coil current I1 flowing through a sending coil L1. A waveform of the receiving coil voltage Vd takes a ridge shape protruding upward as shown in the drawing and has an amplitude of AM1. Subsequently, when a cmp1 detects that the receiving coil voltage Vd has exceeded a threshold Vthp, the receiving circuit 30 determines that the coil current I1 in a positive direction (in FIG. 2, a direction coinciding with an arrow of the coil current I1) has been generated. Therefore, a detection is made that a rising edge of the input voltage VIN has been inputted to the sending circuit 10b and the output voltage VOUT is set to a high level (arrow Y23).

At time t22, in response to a falling edge of the pulse signal PS1, the gate controlling signal SP1b transitions to a low level (arrow Y24). Accordingly, since the transistor P1b is turned off and the second current path is blocked, a current path of the coil current I1 is limited to only the first current path. As a result, since joint impedance of the current paths is in a high state, the coil current I1 starts to decrease.

In addition, at time t23, the gate controlling signal SP1 transitions to a low level after a delay of a delay time DT2 from a falling edge of the pulse signal PS1b. As a result, the transistor P1 is turned off and the first current path is blocked. Accordingly, since both the first current path and the second current path are blocked, the coil current I1 starts to decrease at an even greater gradient. In addition, at time t23, since the gate controlling signal SN1 transitions to a high level, the transistor N1 is turned on. Furthermore, at time t24, the coil current I1 becomes 0.

The receiving coil voltage Vd is obtained in proportion to a rate of decrease (di/dt) of the coil current I1 from the high pass filter 32 (arrow Y25). A waveform of the receiving coil voltage Vd takes a valley shape protruding downward as shown in the thawing and has an amplitude of AM2.

In addition, a gradient of decrease of the coil current I1 from time t22 to time t24 is set smaller than a gradient of increase of the coil current I1 from time t21 to time t22. Therefore, with the receiving coil voltage Vd, the amplitude AM2 during the decrease of the coil current I1 becomes smaller than the amplitude AM1 during the increase of the coil current I1.

Moreover, a size of the transistor P1 is set larger than a size of the transistor P1b. In addition, the transistor P1b is turned off first and then the transistor P1 is turned off. Therefore, control can be performed so that a gradient of decrease of the coil current I1 from time t22 to time t23 becomes smaller than a gradient of decrease of the coil current I1 from time t23 to time t24.

Moreover, operations similar to the period PE1 are performed during the period PE2. Therefore, a gradient of decrease of the coil current I1 from time t27 to time t29 is set smaller than a gradient of increase of the coil current I1 from time t26 to time t27. As a result, with the receiving coil voltage Vd, the amplitude AM2 during the decrease of the coil current I1 becomes smaller than the amplitude AM1 during the increase of the coil current I1. Since contents of operations during the period PE2 are similar to contents of operations during the period PE1, a detailed description will be omitted herein.

An effect of the sending circuit 10a according to the third embodiment will be described. The receiving coil voltage Vd is proportional to a time rate of change (di/dt) of the coil current I1 flowing through the sending roil L1. In addition, during the period PE1, the transistors P1 and P1b are controlled so as to be turned on at the same time when entering an on-state (time t21) and turned of at different timings (time t22 and time t23) when entering an off-state. In a similar manner, during the period PE2, the transistors P2 and P2a are controlled so as to be turned on at the same time when entering an on state (time t21) and turned off at different timings (time t22 and time t23) when entering an off-state.

As a result, the time rate of change of the coil current I1 flowing through the sending coil L1 can be controlled so that a rate of decrease in an off-state of a transistor is reduced with respect to a rate of increase in an on-state of the transistor. Accordingly, the amplitude AM1 of the receiving coil voltage Vd generated during an on-state of a transistor can be set greater than the amplitude AM2 of the receiving coil voltage Vd generated during an off-state of the transistor. Therefore, a waveform that appears in the receiving coil voltage Vd in accordance with a rising (time t21) of the input voltage VIN can be arranged so as to have a ridge shape (from time t21 to time t22) having a large amplitude. In addition, a waveform that appears in the receiving coil voltage Vd in accordance with a falling (time t26) of the input voltage VIN can be arranged so as to have a valley shape (from time t26 to time t27) having a large amplitude. Consequently, by having a comparator cmp1 with a threshold of Vthp detect the receiving coil voltage Vd exceeding the threshold Vthp, a rising of the input voltage VIN can be detected. In addition, by having a comparator cmp2 with a threshold of Vth detect the receiving coil voltage Vd falling below the threshold Vthn, a falling of the input voltage VIN can be detected. Therefore, an on-state of a transistor can be more easily detected at the receiving coil L2. Consequently, an output voltage VOUT can be more reliably restored.

Furthermore, when controlling the time rate of change of the coil current I1 flowing through the sending coil L1 by gradually turning off a transistor, generally, a midpoint voltage of on/off voltages of the transistor must be used. Since the midpoint voltage is a state in which the transistor is unstable, noise may be generated and a signal may be erroneously transmitted. On the other hand, since a control of gradually turning off a transistor need not be performed with the sending circuit 10b according to the present application, a midpoint voltage of on/off voltages of the transistor need not be used. Accordingly, since control of the time rate of change of the coil current I1 flowing through the sending coil L1 can be realized in a state in which the transistor is stable, generation of noise can be suppressed.

While specific embodiments of the present application have been described in detail above, such description is for illustrative purposes only and is not intended to limit the scope of claims. Techniques described in the claims include various modifications and changes made to the specific examples illustrated above.

The H-bridge circuit 19a according to the second embodiment comprises the transistor N3 connected in parallel with the transistor N1 and the transistor N4 connected in parallel with the transistor N2. In addition, the transistors N3 and N4 are controlled to constantly be in the on-state. In this case, as shown in an H-bridge circuit 19c in FIG. 13, resistive elements R3 and R4 may be added to drain terminals of the transistors N3 and N4. Accordingly, impedance of the transistors N3 and N4 in the on-state can be increased. Consequently, a value of a through current flowing from the transistor P1 to the transistor N3 and a value of a through current flowing from the transistor P2 to the transistor N4 can be sufficiently reduced. In addition, the impedance of the transistors N3 and N4 in the on-state can be adjusted by the resistive elements R3 and R4. Therefore, the on-state impedance need not be adjusted by adjusting the size of the transistor. As a result, sizes of the transistors N3 and N4 can be set arbitrarily.

Figure 13:
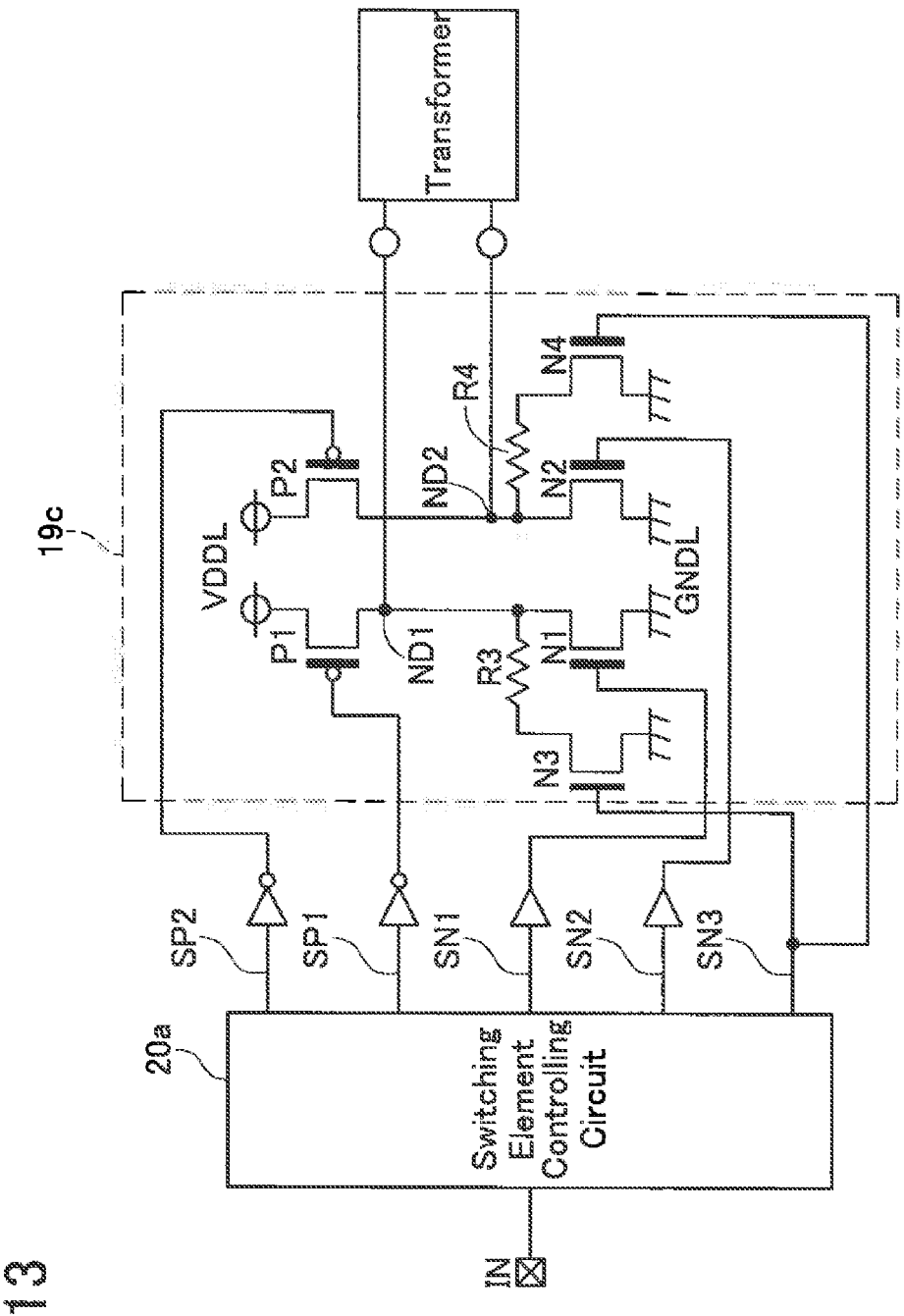
FIG. 13 is an example of modification of an H-bridge circuit.
Figure 14:
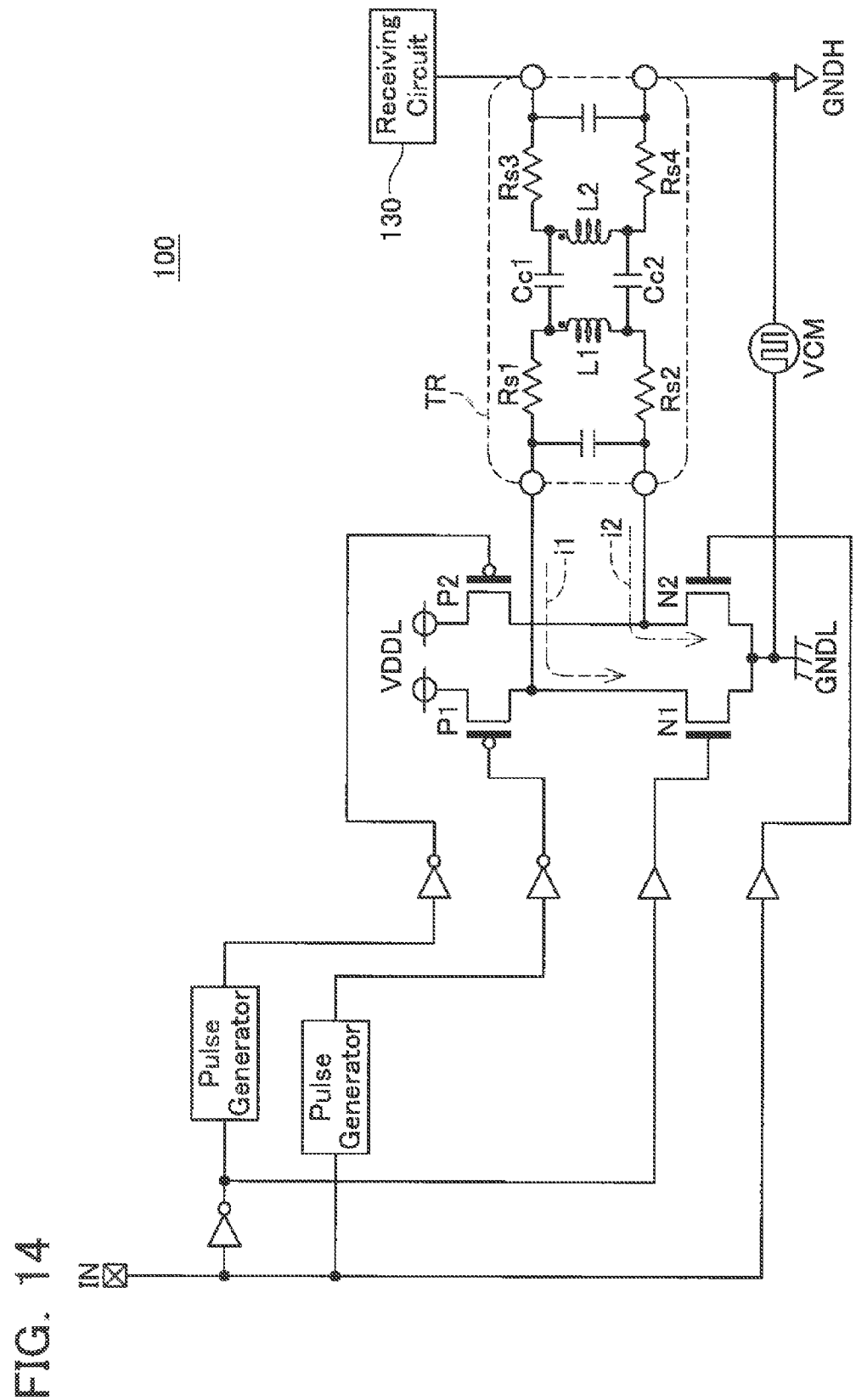
FIG. 14 is a circuit diagram of a prior-art signal transmitting apparatus.

In addition, while a case of the H-bridge circuit 19c shown in FIG. 13 comprising transistors N3 and N4 which are constantly turned on has been described, modes are not limited thereto. The H-bridge circuit 19c may be configured without the transistor N3 so that a node ND1 is connected to a ground voltage GNDL solely by the resistive element R3. Alternatively, a configuration may be adopted in which the transistor N4 is not provided and the node ND1 is connected to the ground voltage GNDL solely by the resistive element R4. Even with these configurations, both the first terminal E11 and the second terminal E12 of the sending coil L1 can constantly be kept in a low impedance state.

Furthermore, while a case has been described in the first embodiment (FIG. 6) in which control is performed so that both transistors N1 and N2 are turned on during a period from tune t4 to time 16 in the period PE1 (area A1) and a period from time t9 to time t10 in the period PE2 (area A2), modes are not limited thereto. Control may be performed so that both transistors P1 and P2 are turned on during these periods. The object of setting voltages of both terminals of the sending coil L1 to low impedance can also be achieved by this configuration. However, it is more favorable to turn on the transistors N1 and N2 during these periods. This is because source voltages of the transistors N1 and N2 are fixed by the ground voltage GNDL. Accordingly, since the transistors N1 and N2 can be reliably operated even in a state in which the supply voltage VDDL is unstable such as during activation or falling of the signal transmitting circuit 1, the H-bridge circuit 19 can be expected to operate in a stable manner.

Moreover, while a case has been described in the second embodiment in which voltages of both terminals of the sending coil L1 is maintained at the ground voltage GNDL, modes are not limited thereto. The voltages of both terminals of the sending coil L1 may be constantly maintained at the supply voltage VDDL. The object of setting voltages of both terminals of the sending coil L1 to low impedance can also be achieved by this configuration. Consequently, an advantageous effect of the present application of suppressing generation of the noise voltage due to the common mode voltage VCM can be achieved.

In addition, while a case has been described in the third embodiment in which a single transistor P1b is connected in parallel with the transistor P1 and a single transistor P2b is connected in parallel with the transistor P2, modes are not limited thereto. Two or more transistors may be connected in parallel with the transistor P1 and two or more transistors may be connected in parallel with the transistor P2. Furthermore, the transistors connected in parallel may be turned off at respectively different timings. Accordingly, the time rate of change of the coil current I1 can be precisely controlled. Moreover, by arranging sizes of the transistors connected in parallel with the transistors P1 and P2 so as to differ from each other, the time rate of change of the coil current I1 can be more precisely controlled.

In addition, while a case has been described in the third embodiment in which a time rate of change in an off-state is controlled by turning on the transistors P1 and P1b at the same time when entering an on-state and turning off the transistors P1 and P1b at different timings when entering an off-state, modes are not limited thereto. The time rate of change in an on-state can also be controlled by turning on the transistors P1 and P1b at different timings when entering an on-state and turning off the transistors P1 and P1b at the same time when entering an off-state.

Furthermore, it is to be understood that the technical elements described in the present specification and the drawings exhibit technical usefulness solely or in various combinations thereof and shall not be limited to the combinations described in the claims at the time of filing. The techniques illustrated in the present specification and the drawings are to achieve a plurality of objectives at the same time, and technical usefulness is exhibited by attaining any one of such objectives.

The invention claimed is:

1. A signal transmitting apparatus having a sending coil and receiving coil, comprising:
    an upper first switching element provided between a first terminal of the sending coil and a power supply terminal of a high reference voltage;
    a lower first switching element provided between the first terminal and a power supply terminal of a low reference voltage;
    an upper second switching element provided between a second terminal of the sending coil and the power supply terminal of the high reference voltage;
    a lower second switching element provided between the second terminal and the power supply terminal of the low reference voltage; and
    a switching element controlling module that controls the upper first switching element, the lower first switching element, the upper second switching element and the lower second switching element,
    wherein the sending coil and the receiving coil are insulated electrically,
    the signal is transmitted from the sending coil to the receiving coil,
    the switching element controlling module performs a first control and a second control,
        the first control generates a coil current flowing through the sending coil in a first direction by turning on the upper first switching element and the lower second switching element and turning off the upper second switching element and the lower first switching element,
    and then turns on the lower first switching element in response to turning off the upper first switching element, and
        the second control generates a coil current flowing through the sending coil in a second direction by turning off the upper first switching element and the lower second switching element and turning on the upper second switching element and the lower first switching element,
    and then turns on the lower second switching element in response to turning off the upper second switching element.

2. The signal transmitting apparatus as in claim 1, wherein the switching element controlling module further comprises:
    a first pulse outputting module that outputs a first pulse signal by detecting a rising edge of an inputted signal;
    a second pulse outputting module that outputs a second pulse signal by detecting a falling edge of the inputted signal;
    a first inverting module that generates an inverted first pulse signal that is a signal having inverted the first pulse signal; and
    a second inverting module that generates an inverted second pulse signal that is a signal having inverted the second pulse signal,
    wherein the first pulse signal is supplied to the upper first switching element, the inverted first pulse signal is supplied to the lower first switching element,
    the second pulse signal is supplied to the upper second switching element, and the inverted second pulse signal is supplied to the lower second switching element.

3. The signal transmitting apparatus as in claim 2, wherein the switching element controlling module further comprises a delay circuit that delays rising edges of the first pulse signal, the second pulse signal, the inverted first pulse signal and the inverted second pulse signal by a predetermined time, wherein the first pulse signal and the second pulse signal outputted from the delay circuit are supplied to the upper first switching element and the upper second switching element, and the inverted first pulse signal and the inverted second pulse signal outputted from the delay circuit are supplied to the lower first switching element and the lower second switching element.

4. The signal transmitting apparatus as in claim 1, further comprising:
   a lower first current path that is connected in parallel to the lower first switching element; and
   a lower second current path that is connected in parallel to the lower second switching element,
   wherein impedance of the lower first current path is higher than impedance of the lower first switching element that is in an on-state, and
   impedance of the lower second current path is higher than impedance of the lower second switching element that is in an on-state.

5. The signal transmitting apparatus as in claim 4, wherein each of the lower first switching element, the lower second switching element, the lower first current path and the lower second current path comprises an NMOS transistor,
   wherein a size of the NMOS transistor in the lower first current path is smaller than a size of the NMOS transistor in the lower first switching element,
   a size of the NMOS transistor in the lower second current path is smaller than a size of the NMOS transistor in the lower second switching element, and
   the switching element controlling module controls the NMOS transistors in the lower first current path and the lower second current path in an on-state at all times.

6. The signal transmitting apparatus as in claim 4, wherein each of the lower first switching element, the lower second switching element, the lower first current path and the lower second current path comprises an NMOS transistor,
   the lower first current path further comprises a first resistive element connected to a drain terminal of the NMOS transistor of the lower first current path,
   the lower second current path further comprises a second resistive element connected to a drain terminal of the NMOS transistor of the lower second current path, and
   the switching element controlling module controls the NMOS transistors in the lower first current path and the lower second current path in an on-state at all times.

7. The signal transmitting apparatus as in claim 1, further comprising:
   a parallel first switching element that is connected in parallel to the upper first switching element; and
   a parallel second switching element that is connected in parallel to the upper second switching element,
   wherein, in the first control, the switching element controlling module turns on the upper first switching element and the parallel first switching element at the same time, and then turns off the upper first switching element and the parallel first switching element at different timings,
   in the second control, the switching element controlling module turns on the upper second switching element and the parallel second switching element at the same time, and then turns off the upper second switching element and the parallel second switching element at different timings.

8. The signal transmitting apparatus as in claim 7, wherein each of the upper first switching element, the parallel first switching element, the upper second switching element and the parallel second switching element comprises an PMOS transistor,
   wherein a size of the PMOS transistor in the parallel first switching element is smaller than a size of the PMOS transistor in the upper first switching element,
   a size of the PMOS transistor in the parallel second switching element is smaller than a size of the PMOS transistor in the upper second switching element,
   in the first control, the switching element controlling module turns off the upper first switching element after the parallel first switching element is turned off, and
   in the second control, the switching element controlling module turns off the upper second switching element after the parallel second switching element is turned off.

9. The signal transmitting apparatus as in claim 1, wherein a number of coil windings of the receiving coil is larger than a number of coil windings of the sending coil.

* * * * *

UNITED STATES PATENT AND TRADEMARK OFFICE
CERTIFICATE OF CORRECTION

PATENT NO. : 8,638,158 B2  Page 1 of 1
APPLICATION NO. : 13/576292
DATED : January 28, 2014
INVENTOR(S) : H. Morishita et al.

It is certified that error appears in the above-identified patent and that said Letters Patent is hereby corrected as shown below:

In the Specification

At column 1, line 62, change "it is" to -- i1 is --.

At column 4, line 18, change "bet" to -- between --.

At column 7, line 9, change "roil" to -- coil --.

At column 14, line 1, change "Shown" to -- shown --.

At column 14, line 33, change "E11" to -- E12 --.

At column 16, line 32, change "of a se" to -- of a noise --.

At column 16, line 41, change "funning" to -- forming --.

At column 21, line 11, change "time 16" to -- time t6 --.

Signed and Sealed this
Eighth Day of July, 2014

Michelle K. Lee
*Deputy Director of the United States Patent and Trademark Office*